(12) United States Patent
Weinstein et al.

(10) Patent No.: US 10,316,486 B2
(45) Date of Patent: *Jun. 11, 2019

(54) CONTAINMENT MATERIAL WITH STRUCTURED FELT SURFACE

(71) Applicants: Daniel A. Weinstein, Newton, MA (US); Reuben Weinstein, Newton, MA (US)

(72) Inventors: Daniel A. Weinstein, Newton, MA (US); Reuben Weinstein, Newton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/994,637

(22) Filed: May 31, 2018

(65) Prior Publication Data

US 2018/0274200 A1    Sep. 27, 2018

Related U.S. Application Data

(63) Continuation-in-part of application No. 14/707,995, filed on May 8, 2015, which is a continuation-in-part (Continued)

(51) Int. Cl.
*E02B 11/00* (2006.01)
*E02B 3/12* (2006.01)
(Continued)

(52) U.S. Cl.
CPC ............ *E02D 31/004* (2013.01); *B32B 3/30* (2013.01); *B32B 5/022* (2013.01); *B32B 5/024* (2013.01);
(Continued)

(58) Field of Classification Search
CPC . E02B 11/00; E02B 3/122; E02B 3/04; B09B 1/004; Y02W 30/32; E02D 31/025
(Continued)

(56) References Cited

U.S. PATENT DOCUMENTS 1,352,733 A * 9/1920 Egerton ................. A47G 27/02
                                                        273/287
2,005,659 A * 6/1935 Matteson ............... A47L 23/24
                                                        40/618
(Continued)

FOREIGN PATENT DOCUMENTS

EP       2589705         5/2013
EP       2589705 A1 *    5/2013    ............. E02D 31/00

*Primary Examiner* — Benjamin F Fiorello
*Assistant Examiner* — Edwin J Toledo-Duran
(74) *Attorney, Agent, or Firm* — Thomas P. O'Connell; O'Connell Law Office

(57) ABSTRACT

A containment material for a containment system to provide protection against the diffusion of contaminants in a containment area. A structured felt geotextile surface layer is joined with a geomembrane barrier layer to form a lamination. The geomembrane barrier layer is substantially impervious to liquid diffusion. The structured felt geotextile surface layer comprises a needle-punched, non-woven felt with an upper surface structured to have a surface pattern of peaks and valleys. A containment system is formed from a plurality of strips of containment material joined by liquid-impervious bonds to provide coverage to the containment area. A process for forming a containment material comprises providing a structured felt geotextile layer formed with first and second needling operations to produce a surface pattern and a liquid impervious geomembrane barrier layer and joining the layers to form a lamination.

40 Claims, 12 Drawing Sheets
(7 of 12 Drawing Sheet(s) Filed in Color)

Related U.S. Application Data of application No. 14/557,029, filed on Dec. 1, 2014, now abandoned.

(51) Int. Cl.

| | |
|---|---|
| *E02B 3/04* | (2006.01) |
| *E02D 31/02* | (2006.01) |
| *E02D 31/00* | (2006.01) |
| *B32B 5/02* | (2006.01) |
| *B32B 5/26* | (2006.01) |
| *B32B 37/18* | (2006.01) |
| *B32B 38/00* | (2006.01) |
| *B32B 3/30* | (2006.01) |

(52) U.S. Cl.
CPC ............... *B32B 5/26* (2013.01); *B32B 37/18* (2013.01); *B32B 38/00* (2013.01); *B32B 2038/0072* (2013.01); *B32B 2250/03* (2013.01); *B32B 2255/02* (2013.01); *B32B 2255/26* (2013.01); *B32B 2262/0269* (2013.01); *B32B 2307/3065* (2013.01); *B32B 2307/7265* (2013.01); *B32B 2377/00* (2013.01)

(58) Field of Classification Search
USPC ............ 405/19, 38, 45, 50, 129.45, 129.57, 405/129.75, 129.85
See application file for complete search history.

(56) References Cited

U.S. PATENT DOCUMENTS

| | | | | | |
|---|---|---|---|---|---|
| 4,651,393 | A | * | 3/1987 | Dilo | D04H 18/02 28/111 |
| 5,056,960 | A | * | 10/1991 | Marienfeld | B09B 1/00 405/129.6 |
| 5,137,393 | A | * | 8/1992 | Fuhr | B09B 1/004 405/129.45 |
| 5,144,730 | A | * | 9/1992 | Dilo | D04H 1/46 28/109 |
| 5,747,134 | A | * | 5/1998 | Mohammed | B09B 1/00 428/57 |
| 5,815,995 | A | * | 10/1998 | Adam | A47L 23/24 52/177 |
| 7,678,443 | B2 | * | 3/2010 | Schulz | B29C 59/022 428/172 |
| 8,221,567 | B2 | * | 7/2012 | Tate | B01D 29/012 156/73.1 |
| 2003/0089236 | A1 | * | 5/2003 | Zhang | B03C 3/155 96/59 |
| 2014/0363611 | A1 | * | 12/2014 | Yoshida | B32B 5/26 428/95 |

* cited by examiner

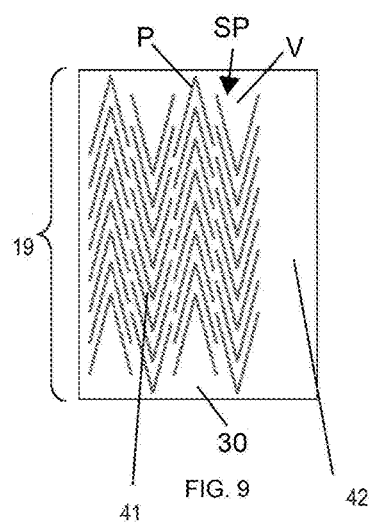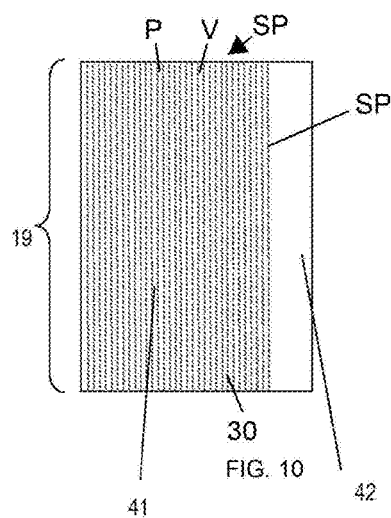
FIG. 9  FIG. 10

CONTAINMENT MATERIAL WITH STRUCTURED FELT SURFACE

RELATED APPLICATIONS

This application is a continuation-in-part of U.S. patent application Ser. No. 14/707,995, filed May 8, 2015, which is a continuation-in-part of U.S. patent application Ser. No. 14/557,029, filed Dec. 1, 2014, the entirety of each being incorporated herein by reference.

FIELD OF THE INVENTION

The invention disclosed herein relates to environmental protection. More particularly, disclosed herein is a containment material with a felt geotextile layer structured to have a surface pattern and married to a geomembrane barrier to provide substantially impervious protection against the diffusion of contaminants in a containment area while providing high traction and fluid management.

BACKGROUND OF THE INVENTION

The effective containment of potential environmental contaminants is critical in a number of applications, including in oil fields, drilling installations, loading and distribution areas, fracking and completion areas, and other areas where potential environmental contaminants are to be contained. For example, oil and gas production activities commonly require the use of chemicals, drilling fluids, and other potentially hazardous materials for production. The containment of environmental pollutants while providing a safe and durable working surface for persons and equipment traversing the same are vitally important and well-recognized needs.

A variety of technologies have been introduced to control the escape of environmental pollutants. In one such technology, containment materials are disposed atop a ground surface in a production area seeking to provide a barrier to the escape of contaminants, including the chemicals, drilling fluids, and other materials used in production. The containment materials seek to prevent contaminant infiltration into the ground and to avoid environmental pollution deriving from potential spills of the materials used and those produced. Properly implemented, assembled, and intact, such containment materials capture pollutants prior to their escape into the environment and provide a work surface for persons and equipment.

As is noted, for instance, in European Patent Publication No. 2,589,705 of Powell for Ground Containment Liners, it has been known for many years in the art of containment systems and methods for production areas, such as oil and gas production areas, to provide a geomembrane containment material formed by a low permeability synthetic membrane liner or barrier. The geomembrane was typically formed from continuous polymeric sheeting to control fluid migration. As Powell further recognizes, it has been a common practice in the field of containment systems and methods to apply a layer of geotextile, such as needle-punched polypropylene felt, under the geomembrane to protect the geomembrane from punctures, such as from the heavy equipment that often must travel over the geomembrane.

Prior art systems and methods are also known wherein a geotextile layer is disposed over a geomembrane layer seeking to increase traction. Indeed, looking to U.S. Pat. No. 5,747,134 to Mohammed, et al., which is discussed in the background portion of Powell and which was filed in 1994, containment materials with a geomembrane layer as a barrier and a geotextile layer under the geomembrane layer for damage protection have been used in the field for nearly fifty years. Mohammed notes that the geotextile layer in such combinations were known to be made of nonwoven or woven material.

Powell recognizes the slip hazards presented by prior art geomembranes used for containment in oil and gas sites, noting that they are extremely slippery to work on. Powell further notes the prior art practice of placing a geotextile layer over a geomembrane layer without bonding the two together and how such geotextile layers can slip and slide to produce a slip hazard. Throughout, Powell discloses asserted solutions with the goal of providing slip resistance, emphasizing that Powell's embedded polymeric barrier layer should not extend through the entire thickness of the felt to prevent slipperiness and, further, that the composite can be treated with brine solutions to prevent slippery ice from accumulating during cold weather.

Despite roughly fifty years of geotextile fabric layers being used above, below, and above and below geomembrane barrier layers in containment systems and despite the oft-stated need for providing slip resistance, increased traction, and fluid management in such applications, the surface of the geotextile layer in containment materials for production areas and other hazardous material situations has invariably been flat. Concomitantly, the need for a high-traction, durable, puncture and leak-resistant containment material has thus long existed and has been critical to safety and minimized environmental impacts.

The present inventors have thus recognized the need for containment material for forming containment systems for ground protection that is rugged, reusable, recyclable, and repairable, and that can be easily installed and maintained to avoid environmental impact while providing improved traction and safe use to persons and equipment.

SUMMARY OF THE INVENTION

With a knowledge of the needs in the art relating to ground containment materials, the present inventors set forth with the broadly stated object of providing a containment material and a containment system based on such a containment material that provide for the containment of contaminants while exhibiting a high-traction surface to persons and heavy equipment within a containment area.

A further object of the invention is to provide a containment material for containment areas that is durable and resistant to punctures and leaks.

A related object of embodiments of the invention is to provide a ground containment material that exhibits substantially impervious protection against the diffusion of contaminants, such as in production activities, while providing increased traction and fluid management.

Another related object of embodiments of the invention is to provide a ground containment material that prevents the escape of environmental pollutants from a containment area.

These and further objects, advantages, and details of the present invention will become obvious not only to one who reviews the present specification and drawings but also to those who have an opportunity to experience an embodiment of the ground containment material and ground containment systems based thereon in operation. Although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth the foregoing objects, the present invention comprises a containment material for a containment system for providing protection to a containment area against the diffusion of contaminants. A structured felt geotextile surface layer is joined with a geomembrane barrier layer to form a lamination. The structured felt geotextile surface layer comprises a needle-punched, non-woven felt fabric that is structured to have a three-dimensional surface pattern in the upper surface thereof with plural peaks and plural valleys. The geomembrane barrier layer is substantially impervious to liquid diffusion.

In certain practices of the invention, the surface pattern in the upper surface of the structured felt geotextile surface layer takes the form of a pattern forming alphanumeric characters, such as letters, to form words, numbers, and combinations thereof Alternatively or additionally, the structured surface pattern could comprise a geometric pattern, a chevron pattern, a corduroy pattern, or any other structured surface pattern. Herein, the term structured shall mean that the geotextile surface layer has a surface pattern. The surface pattern comprises three-dimensional structuring.

To form the surface pattern, the structured felt geotextile surface layer is needle-punched in a first process to create a needled, non-woven web of fibers. Then the web of fibers is exposed to a secondary structuring process to structure the geotextile felt surface layer to have the pattern of peaks and valleys. The secondary structuring process comprises a secondary needling process that reorients the fibers of the carded web mechanically.

The geomembrane barrier layer and the structured geotextile surface layer can be joined in any effective way. In one practice of the invention, the geomembrane barrier layer is extruded onto the structured geotextile surface layer.

The structured felt geotextile surface layer has a thickness of non-woven felt fabric in the plural valleys less than a thickness of non-woven felt fabric in the plural peaks. For instance, the structured felt geotextile surface layer can have a thickness in the plural valleys of between approximately one-quarter and one-half of a thickness of the structured felt geotextile surface layer in the plural peaks.

The geomembrane barrier layer can be formed from woven para-aramid synthetic fibers coated with a secondary material to be impervious to liquid diffusion through the geomembrane barrier layer. For example, the secondary material could be a polymeric material.

At least one of the geomembrane barrier layer and the geotextile surface layer can be fire resistant. The materials for the layers can be chosen to be fire resistant. Additionally or alternatively, the layers can be treated for fire resistance.

The geomembrane barrier layer and the structured felt geotextile surface layer are joined to form a strip of containment material with a longitudinal orientation. In such embodiments, the pattern of peaks and valleys has a predetermined longitudinal orientation aligned with the longitudinal orientation of the strip of containment material. For instance, the ridges of the peaks and the furrows of the valleys can traverse longitudinally along the strip of containment material in parallel to opposed longitudinal edges of the strip of containment material.

As used herein, the term strip should not be interpreted to limit the referenced structure to any particular width or any proportion of width compared to length. Within the scope of the invention, for instance, strips could be wider than they are long or longer than they are wide. Strips could alternatively be referred to as panels.

Where the containment material is disposed in a strip, the strip can have a patterned portion comprising the structured felt geotextile surface layer laminated to geomembrane barrier layer and a joint portion, alternatively referred to as a weld lip, that communicates longitudinally along a first longitudinal edge of the strip beside the patterned portion. The joint portion is devoid of the structured felt geotextile surface layer so that the joint portion forms an elongate joint surface that communicates longitudinally along the first longitudinal edge of the strip. The structured felt geotextile layer communicates from the joint portion to a second longitudinal edge of the strip to form a substantially continuous, patterned surface of structured geotextile surface layer from the joint portion to the second longitudinal edge of the strip. Under this construction, adjacent strips can be joined, such as by plastic welding, in a liquid-impervious relationship by a bonding of the joint portion of a first strip with the geomembrane barrier layer of an adjacent strip.

Under the teachings of the invention, a containment system is created for providing protection to a containment area against the diffusion of contaminants. Under the containment system, a plurality of strips of containment material are provided. Each strip has a first longitudinal edge, a second longitudinal edge, and a longitudinal orientation. Each strip of containment material comprises a structured felt geotextile surface layer joined with a geomembrane barrier layer to form a lamination of the structured felt geotextile surface layer and the geomembrane barrier layer with a lower surface of the structured felt geotextile surface layer joined with an upper surface of the geomembrane barrier layer. The structured felt geotextile surface layer is formed by a needle-punched, non-woven felt fabric structured to have a surface pattern in the upper surface of the structured felt geotextile surface layer with plural peaks and plural valleys. The geomembrane barrier layer is substantially impervious to liquid diffusion. When aligned laterally with edges thereof overlapping, the plurality of strips are joined by a liquid-impervious bond. Protection to a containment area against the diffusion of contaminants is thus provided.

A method for providing protection to a containment area against the diffusion of contaminants can begin with determining a containment area to be protected against the diffusion of contaminants. Then, a plurality of strips of containment material can be provided, each strip with a first longitudinal edge, a second longitudinal edge, and a longitudinal orientation. Each such strip of containment material comprises a structured felt geotextile surface layer joined with a geomembrane barrier layer to form a lamination of the structured felt geotextile surface layer and the geomembrane barrier layer with a lower surface of the structured felt geotextile surface layer joined with an upper surface of the geomembrane barrier layer. The structured felt geotextile surface layer comprises a needle-punched, non-woven felt fabric structured to have a surface pattern in the upper surface of the structured felt geotextile surface layer with plural peaks and plural valleys, and the geomembrane barrier layer is substantially impervious to liquid diffusion. With the plurality of strips provided, the plurality of strips can be joined by a liquid-impervious bond to provide protection to the containment area against the diffusion of contaminants.

The containment area can be considered to have a width, and the steps of providing the plurality of strips of containment material and joining the plurality of strips by a liquid-impervious bond can comprise providing the plurality of strips sufficient to cover the width of the containment area. Furthermore, the containment area can be considered to have a length, and the step of providing the plurality of strips can comprise providing a plurality of strips sufficient to cover the length of the containment area.

In the method, the geomembrane barrier layer and the structured felt geotextile surface layer in each of the plurality of strips of containment material are joined to form the strip of containment material with a longitudinal orientation. In each of the plurality of strips of containment material, the pattern of peaks and valleys has a predetermined longitudinal orientation aligned with the longitudinal orientation of the strip of containment material.

Moreover, each of the plurality of strips of containment material can have a patterned portion comprising the structured felt geotextile surface layer with the surface pattern laminated to geomembrane barrier layer and a joint portion that communicates longitudinally along the first longitudinal edge of the strip beside the patterned portion. The joint portion is devoid of the structured felt geotextile surface layer thereby to form an elongate joint surface that communicates longitudinally along the first longitudinal edge of the strip. Adjacent strips of the plurality of strips can then be joined by a liquid-impervious bond of the joint portion of one adjacent strip with the geomembrane barrier layer of a second adjacent strip. The structured felt geotextile layer communicates from the joint portion to the second longitudinal edge of the strip to form a substantially continuous, patterned surface of structured geotextile surface layer from the joint portion to the second longitudinal edge of the strip. With that, when the plurality of strips are laterally joined, a substantially continuous, patterned surface of structured geotextile surface layer can be provided across the width of the containment area.

The invention can be embodied as a process for forming a containment material for providing protection to a containment area against the diffusion of contaminants. The process is founded on the steps of providing a nonwoven, needle-punched, structured felt geotextile surface layer and a geomembrane barrier layer. The structured felt geotextile surface layer comprises a needle-punched, non-woven felt fabric that is structured to have a surface pattern in the upper surface of the structured felt geotextile surface layer with plural peaks and plural valleys, and the geomembrane barrier layer is substantially impervious to liquid diffusion. The structured felt geotextile surface layer with the geomembrane barrier layer are joined to form a lamination of the structured felt geotextile surface layer and the geomembrane barrier layer with the lower surface of the structured felt geotextile surface layer joined with the upper surface of the geomembrane barrier layer.

The step of providing the nonwoven, needle-punched, structured felt geotextile material with a surface pattern in the upper surface of the structured felt geotextile layer with peaks and valleys comprises needle-punching a carded web of fibers to mechanically orient and interlock the fibers of the carded web in a first needle-punching process and then applying a secondary, structuring process to the fibers of the carded web to produce the plural peaks and the plural valleys. The secondary, structuring process comprises a secondary needling process to reorient the fibers of the carded web mechanically.

In the process, the geomembrane barrier layer and the structured felt geotextile surface layer are joined to form a strip of containment material with a longitudinal orientation. There, the pattern of peaks and valleys has a predetermined longitudinal orientation aligned with the longitudinal orientation of the strip of containment material. For instance, the ridges forming the peaks and the furrows forming the valleys can be formed in parallel to the longitudinal orientation of the strip and in parallel to opposed longitudinal edges of the strip.

Plural strips can be joined edgewise to form a larger span of containment material. For instance, the strip of containment material can have a patterned portion comprising the structured felt geotextile surface layer with the surface pattern laminated to geomembrane barrier layer and a joint portion that communicates longitudinally along a first longitudinal edge of the strip beside the patterned portion. The joint portion is devoid of the structured felt geotextile surface layer to form an elongate joint surface that communicates longitudinally along the first longitudinal edge of the strip. Under such embodiments, the structured felt geotextile layer communicates from the joint portion to a second longitudinal edge of the strip to form a substantially continuous, patterned surface of structured geotextile surface layer from the joint portion to the second longitudinal edge of the strip. With this, a larger containment system can be formed by joining the plural strips by liquid-impervious bonds between the joint portion of one adjacent strip with a portion of a geomembrane barrier layer of a second adjacent strip. Adjacent strips can be joined, for instance, by plastic welding.

Strips of containment material can be configured and joined to cover a containment area with a containment system of any size. Depending on the length and width of the containment area, strips can be joined, such as by plastic welding, in substantially any length, width, and number to cover the entire containment area with a containment system that is substantially impervious to the passage of contaminants while providing a continuous, high-traction structured surface. When plural strips are assembled and joined in alignment, the joints between the joined strips become imperceptible, the surface patterns are aligned longitudinally within the strips and in parallel between adjacent strips, and a continuous, high-traction surface pattern of peaks and valleys is presented by the structured felt geotextile surface layers of the several strips. The liquid-impervious, high-traction surface so presented derives in part from the challenging mutual alignment of the geotextile surface layer of each strip with its underlying geomembrane barrier layer during production. The continuous, high-traction surface also results from the advantageous characteristics of the structured surface patterns of the structured felt geotextile surface layer, the impervious nature of the geomembrane barrier layer, and the ability to join adjacent strips to form a consistent, substantially continuous surface pattern over an entire containment system of substantially any size.

The step of joining the structured felt geotextile surface layer with the geomembrane barrier layer to form a lamination of the structured felt geotextile surface layer and the geomembrane barrier layer is carried out by aligning the predetermined longitudinal orientation of the pattern of peaks and valleys of the structured felt geotextile surface layer with the longitudinal orientation of the strip of containment material and joining the structured felt geotextile surface layer with the geomembrane barrier layer.

One will appreciate that the foregoing discussion broadly outlines the more important goals and features of the invention to enable a better understanding of the detailed description that follows and to instill a better appreciation of the inventors' contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the accompanying drawing figures:

FIG. 9 is a top plan view of a portion of a strip of containment material with a patterned geotextile surface layer pursuant to the invention;

FIG. 10 is a top plan view of a portion of a strip of containment material with an alternatively patterned geotextile surface layer pursuant to the invention;

DETAILED DESCRIPTION OF PREFERRED EMBODIMENTS

The containment material disclosed herein and containment systems founded on such containment material are subject to a variety of embodiments, each within the scope of the invention. However, to ensure that one skilled in the art will be able to understand and, in appropriate cases, practice the present invention, certain preferred embodiments of the broader invention revealed herein are described below and shown in the accompanying drawing figures.

The containment material is founded on a structured felt geotextile married to a geomembrane barrier and is operative to contain potential contaminants while providing a high-traction surface to persons and heavy equipment within the containment area. Containment systems can, for instance, provide environmental containment of materials used during or produced by geophysical exploration. For example, the containment systems provide for containment of drilling fluids, hydraulic fluids, drilling mud, and other such materials as may be used during exploration for oil and gas. The containment material and the systems disclosed herein could also provide a portable platform to support equipment in any other types of resource-based activities, including such activities as construction, maintenance, and other such applications. Accordingly, the embodiments disclosed herein with respect to geophysical exploration are merely exemplary and are not limiting.

Figure 1:
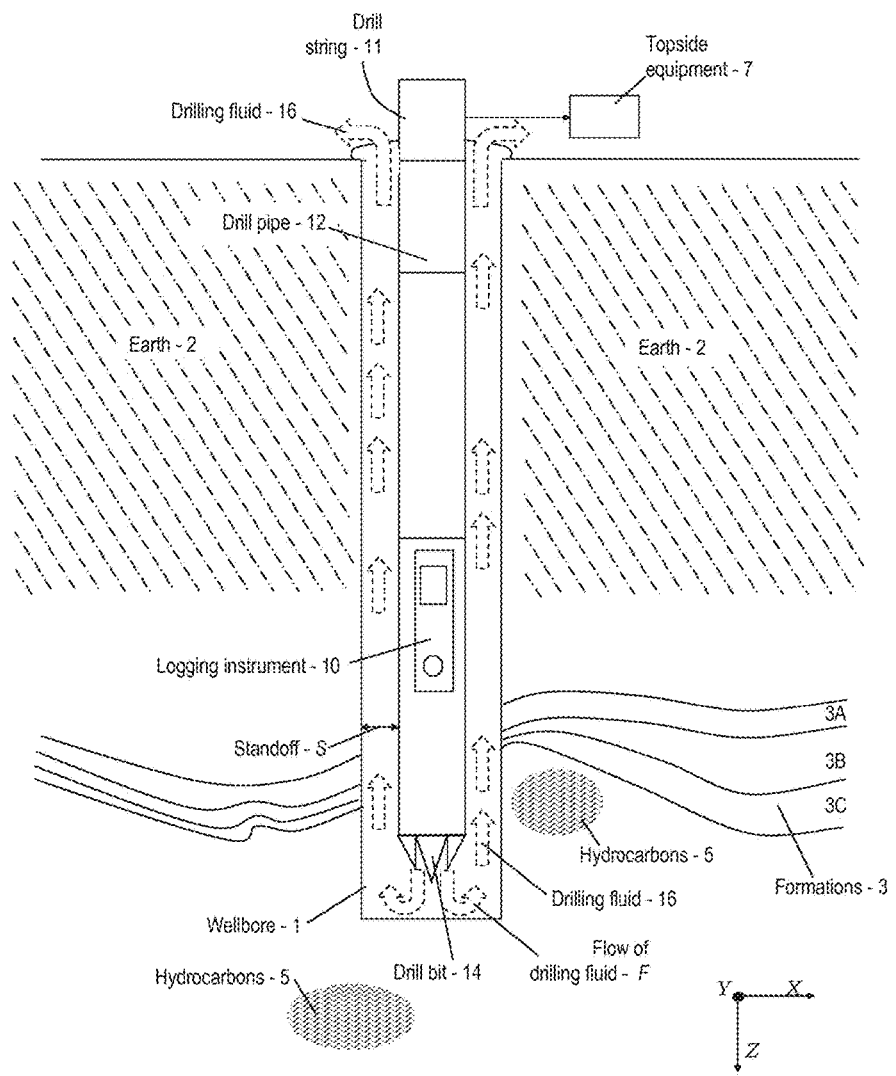
FIG. 1 is a schematic diagram depicting aspects of an exemplary production well.

Looking first to FIG. 1, one instance of a containment area is shown with respect to an apparatus for drilling a wellbore 1, which may alternatively be referred to as a borehole. As a matter of convention, a depth of the wellbore 1 is described to travel along a Z-axis while a cross-section is provided in a plane described to have an X-axis and a Y-axis. The wellbore 1 is drilled into the Earth 2 using a drill string 11 driven by a drilling rig (not shown).

The drilling rig, among other things, provides rotational energy and downward force. The wellbore 1 generally traverses sub-surface materials, which may include various formations 3, such as formations 3A, 3B, 3C. One skilled in the art will recognize that various geologic features as may be encountered in a subsurface environment may be referred to as formations. The array of materials down the borehole 1 may be referred to as sub-surface materials. That is, the formations 3 are formed of sub-surface materials. Accordingly, as used herein, it should be considered that, while the term formation generally refers to geologic formations, sub-surface material includes any material and may include such materials as solids, fluids, gases, liquids, and the like.

In this example, the drill string 11 includes lengths of drill pipe 12 that drive a drill bit 14. The drill bit 14 provides a flow of a drilling fluid 16 that typically includes drilling mud. The drilling fluid 16 is often pumped to the drill bit 14 through the drill pipe 12 from which the drilling fluid 16 exits into the wellbore 1. This normally results in an upward flow F of drilling fluid 16 within the wellbore 1. The upward flow generally cools the drill string 11 and components thereof, carries away cuttings from the drill bit 14, and prevents blowout, such as of pressurized hydrocarbons 5.

The drilling fluid 16, which is often referred to as drilling mud, generally flows as a flow F comprising a mixture of materials including, by way of example, the drilling fluid 16, liquids such as water, mud, oil, gases, and formation fluids as may be indigenous to the surroundings. Although drilling fluid 16 may be introduced for drilling operations, the use or the presence of the drilling fluid 16 is neither required for nor necessarily excluded from well operations. Generally, a layer of such materials will exist between an outer surface of the drill string 11 and a wall of the wellbore 1. This layer is referred to as a standoff layer, and includes a thickness, referred to as standoff S. Drilling fluid 16 may comprise or may carry or travel with fluid, loose material, and other potential contaminants that may present an environmental hazard to the ground below, such as through spillage 17. As referenced herein, spillage 17 involves at least partial loss of control of a potentially environmentally hazardous material such that contamination of the environment may be at risk.

The drill string 11 may include equipment for performing Measuring While Drilling (MWD), also referred to as Logging While Drilling (LWD). Performing MWD or LWD generally calls for operation of a logging instrument 10 that is incorporated into the drill string 11 and is designed for operation while drilling. Often, the logging instrument 10 and downhole electronics 13 are coupled to topside equipment 7. The topside equipment 7 may be included to further control operations, to provide greater analysis capabilities, to log data, and to perform similar tasks.

A drill string 11 can be used to drill the wellbore 1 deep into the Earth 2 to facilitate a process of hydraulic fracturing, commonly referred to as fracking. With a wellbore 1 formed, the drill string 11 may be withdrawn. Hydraulic fluid is then introduced into the wellbore 1. The hydraulic fluid may then be pressurized. With that, penetration into the surrounding subsurface formations 3 is realized. When the hydraulic fluid is then at least partially evacuated from the wellbore 1, subsurface materials, such as natural gas, may be harvested.

Hydraulic fluid may include a myriad of environmental contaminants. For example, fracking may make use of chemical additives, such as one or more of the following: acids, such as hydrochloric acid or acetic acid for cleaning perforations and initiating fissure in the near-wellbore rock during a cleaning stage; sodium chloride to delay breakdown of gel polymer chains; polyacrylamide and other friction reducers to decrease turbulence in fluid flow and pipe friction thus allowing pumps to pump at a higher rate without having greater pressure on the surface; ethylene glycol to prevent formation of scale deposits; borate salts for maintaining fluid viscosity during temperature increases; sodium and potassium carbonates to maintain effectiveness of crosslinking materials; glutaraldehyde as a disinfectant of the water (bacteria elimination); guar gum and other water-soluble gelling agents to increase viscosity of the fracturing fluid to deliver proppant into the formation more efficiently; citric acid for corrosion prevention; isopropanol to increase the viscosity of the hydraulic fluid; and others.

Figure 2:
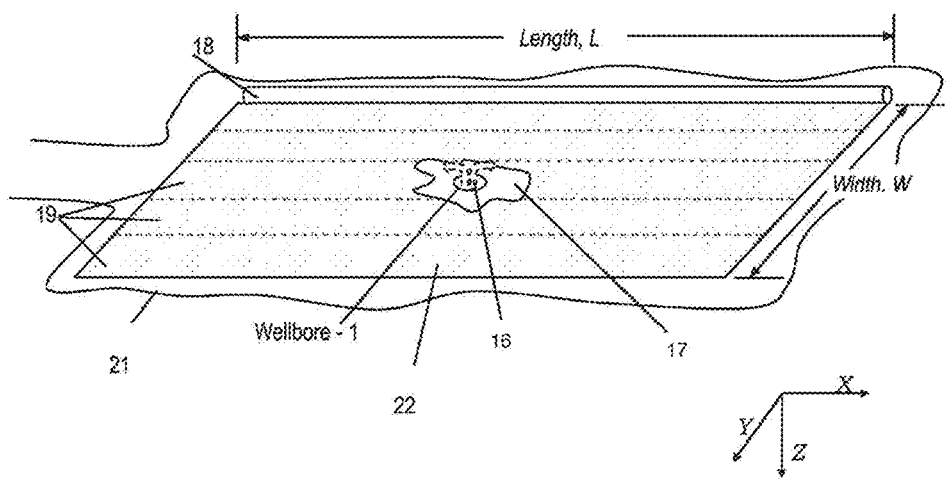
FIG. 2 is a perspective view of one application of a containment system according to the teachings herein.

An exemplary containment area is indicated generally at 21 in FIG. 2 in relation to the formation and operation of a wellbore 1 with it being understood that the containment system 22 is readily applicable in other potentially hazardous applications. In such production operations, the containment area 21 may alternatively be referred to as a production area 21. In practice, the containment area 21 is typically formed with a size intended to be adequate to support all equipment and personnel needed to operate the containment area, such as to create and service the wellbore 1. In preparation for production activities, the containment area 21 is prepared for installation of a containment system 22 formed by a structured containment material as disclosed herein.

Figure 13:
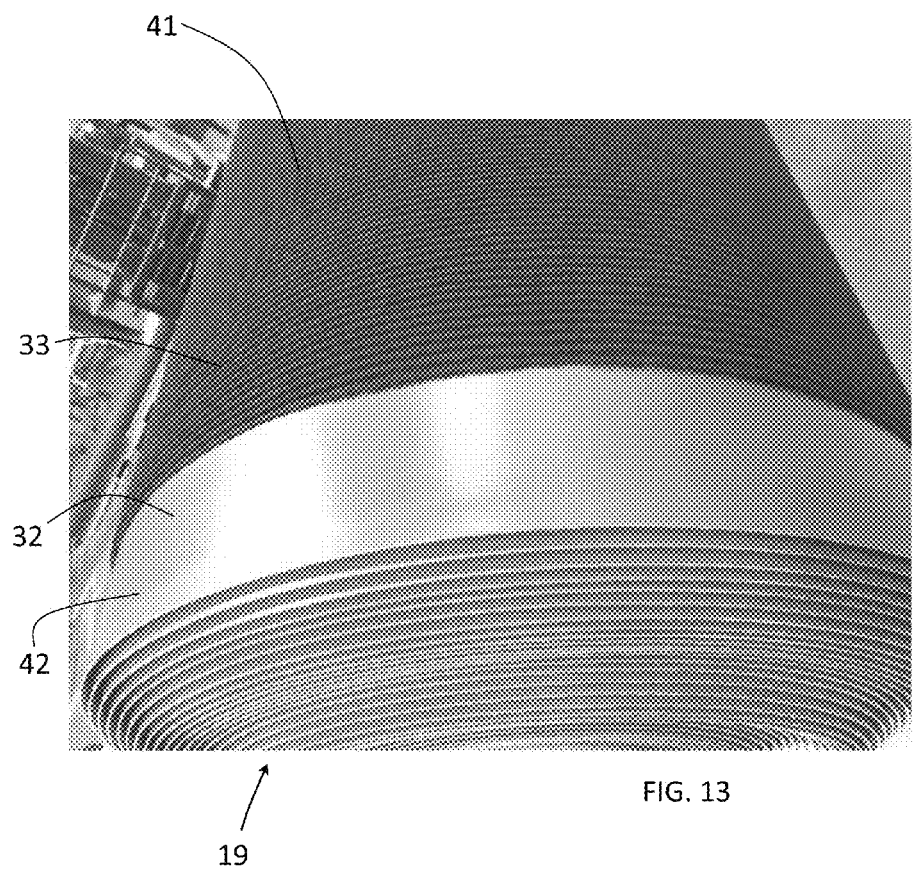
FIG. 13 is a perspective view of a strips of containment material disposed in a roll.
Figure 14:
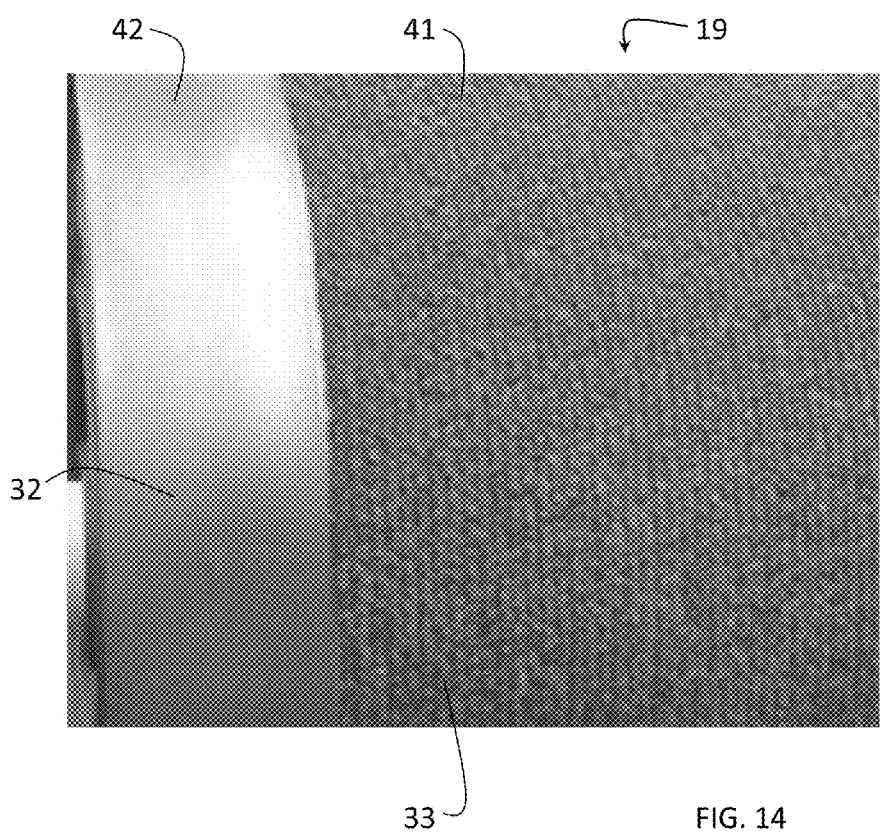
FIG. 14 is a top plan view of a segment of a strip of containment material.

In view of the large and variable size of such production or containment areas 21, the containment system 22 is formed by the edge-to-edge joining of plural strips 19 of containment material. The strips 19 of containment material can, for instance, be maintained in rolls as shown, for instance, in FIG. 13 so that plural strips 19 can be cut to desired lengths, potentially matching lengths, and then joined laterally in a mutually sealed relationship as is discussed further hereinbelow to form a containment system 22 of a desired length L and width W. With the plural strips 19 coupled in a mutually sealed relationship, the containment system 22 thus provides a substantially impervious barrier of material for ground surface protection.

With a containment system 22 formed and installed as in FIG. 2, potentially hazardous materials in a containment area 21 are prevented from passing to a found surface. In some instances, such as where a wellbore 1 is to be drilled, the containment material of the containment system 22 is parted, such as by mechanical separation, to provide an aperture to permit access to the ground surface. For example, a localized aperture can be cut in a desired location in the containment material of the containment system 22. Alternatively, the containment system 22 may be installed around an existing wellbore 1 within an access aperture to the wellbore 1 formed during installation.

Once installed, the containment system 22 provides a barrier between above-surface activities and the potentially contaminating materials involved therein and the bare ground in the containment area 21. The barrier so provided is substantially impervious to fluid penetration, such as through spillage 17 of drilling fluid 16 or other potential hazards.

Figure 3:
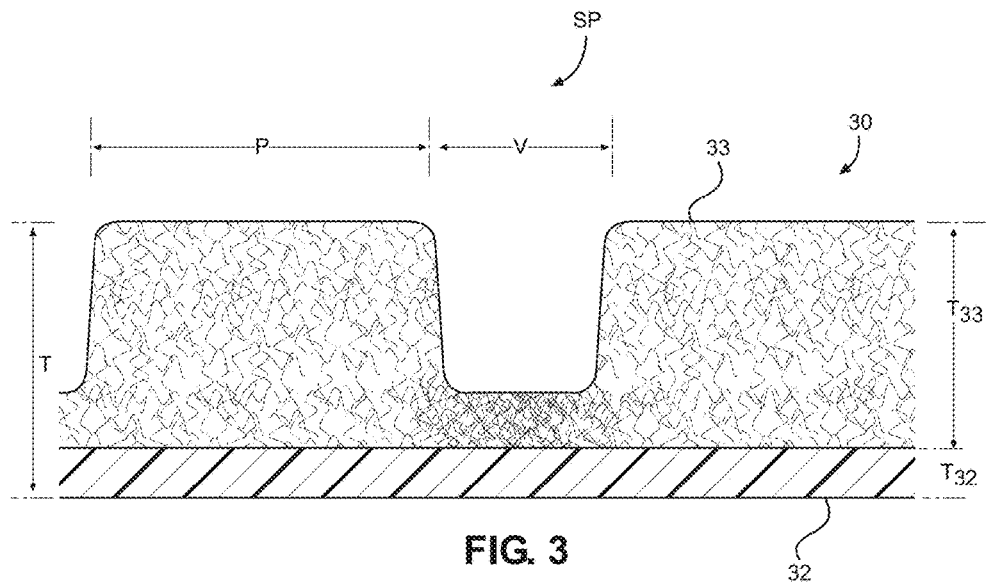
FIG. 3 is a cross-sectional view of a portion of a containment material according to the invention.
Figure 4:
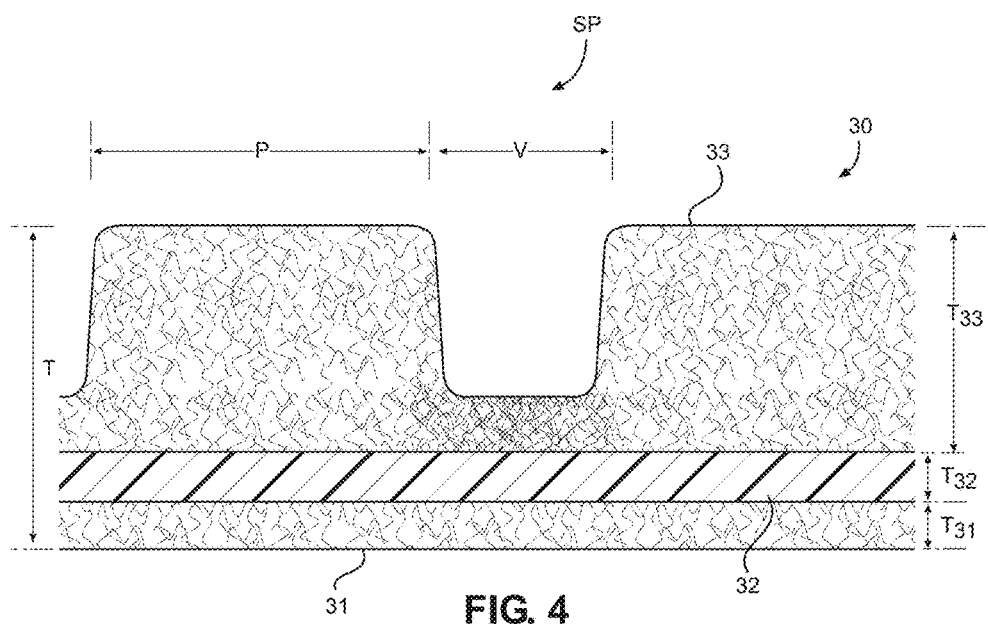
FIG. 4 is a cross-sectional view of a portion of an alternative embodiment of the containment material according to the invention.

Referring now to FIGS. 3 and 4, cross-sections of portions of exemplary embodiments of containment material for the containment system 22 are generally indicated at 30. In each example, the containment material 30 is formed with a structured felt geotextile surface layer 33 married to an upper surface of a geomembrane barrier layer 32. As used herein, the term married shall mean closely or intimately joined to form a lamination. As in FIG. 3, embodiments are contemplated wherein the containment material 30 is founded on a structured felt geotextile surface layer 33 married to a geomembrane barrier layer 32 without sub-layering. However, as in FIG. 4, the containment material 30 can further include a bottom, sub-layer 31 married to the bottom surface of the geomembrane barrier layer 32 to form a tri-lamination. Herein, the containment material 30 is shown and described positioned with the structured felt geotextile surface layer 33 disposed atop the geomembrane barrier layer 32 and, where included, the sub-layer 31 disposed below the geomembrane barrier layer 32. Each layer 33, 32, and 31 may be described under such a convention with an upper surface and a lower surface.

The structured felt geotextile surface layer 33 provides the upper surface for the containment material 30 and the containment system 22 in general. The geotextile surface layer 33 is formed by a needle-punched, non-woven felt textile. The upper surface of the structured felt geotextile surface layer 33 and thus the upper surface of the containment material 30 is structured to have a structured surface pattern SP. The surface pattern SP is formed by plural ridges or peaks P and plural valleys V structured into the geotextile surface layer 33.

The structured pattern SP of the peaks P and valleys V can vary within the scope of the invention as is illustrated by the surface patterns SP depicted in FIGS. 5 through 10. The surface pattern SP on the upper surface of the geotextile surface layer 33 can operate as a pattern for retaining, directing, or draining spillage. The geotextile surface layer 33 can be crafted in varied colors, and the surface pattern SP formed in the structured felt can be varied to comprise or include characters, words, shapes, geometric designs, and other surface patterns SP. The surface layer 33 can exhibit markings, such as visual guides. With the three-dimensional surface pattern SP formed therein, the structured felt geotextile surface layer 33 is slip resistant.

The structured, non-woven felt fabric forming the geotextile surface layer 33 may alternatively be referred to as structured felt. The needle-punched, non-woven felt forming the geotextile surface layer 33 undergoes additional processing steps to produce a needle-punched, structured non-woven felt. The lower surface of the structured, non-woven felt fabric is married to the upper surface of the geomembrane layer 32 as discussed further herein.

To produce the needle-punched, non-woven felt of the geotextile surface layer 33 exhibiting a three-dimensional, or structured, surface pattern SP, the production process involves first a needle-punching process applied to a carded web of fibers. The needle-punching process is carried out by a first needling operation of barbed felting needles that repeatedly pass into and out of the carded web to orient and interlock the fibers of the carded web mechanically. This first needling operation yields a felt with a needled, nonwoven felt web. Then, the needled, nonwoven felt web undergoes a secondary process in the form of a secondary needling process. The secondary needling process mechanically reorients felt fibers within the needled, nonwoven felt web to produce a predetermined structured surface pattern SP within the upper surface of the geotextile layer 33. As FIGS. 3 through 10 show, the structured surface pattern SP has plural valleys V interposed between plural raised ridges or peaks P.

As shown and described herein, infinitely variable surface patterns SP can be created pursuant to the invention. Such surface patterns SP could include, for example, geometric patterns, symbols, characters, lettering, words, and other shapes and characters structured into the geotextile layer 33 to form the upper surface of the geotextile layer 33. Illustrative but non-limiting surface patterns SP are shown in FIGS. 5 through 10.

Figure 5:
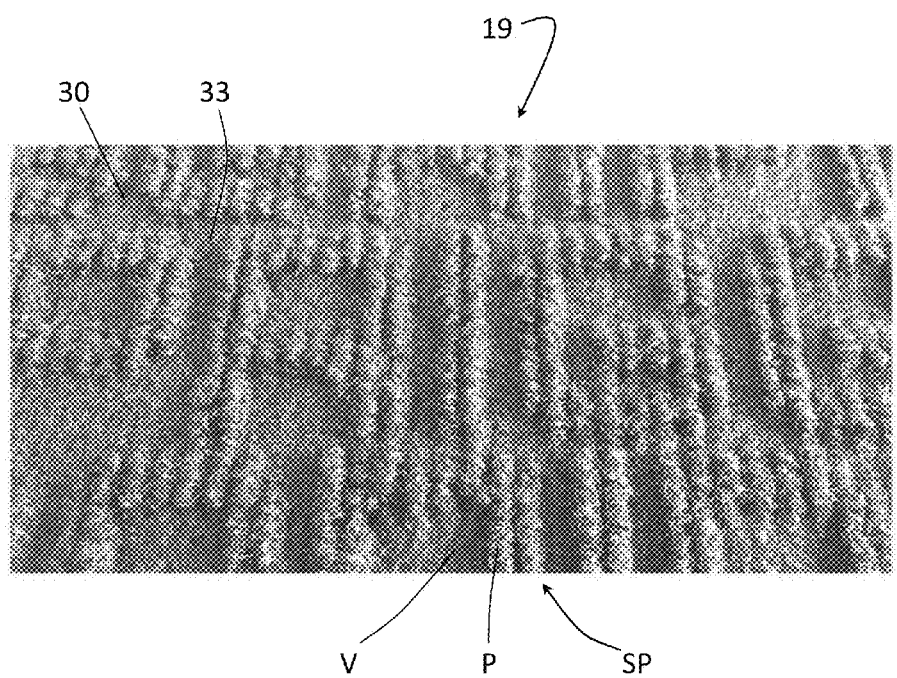
FIG. 5 is a perspective view of a portion of a strip of containment material with a patterned geotextile surface layer comprising lettering as taught herein.

As FIG. 5 shows, for instance, the felt geotextile layer 33 can have a structured surface pattern SP of peaks P and valleys V that form letters, and the letters can form words, in this instance RIG GRIP, which is a registered trademark of Rig Grip, Inc. of Newton, Mass. The structured surface pattern SP could, for instance, include unique branding, location information, or any other characters or text. Here, each character of the surface pattern SP is formed by plural closely spaced segments of raised ridges or peaks P with interposed valleys V configured to provide the shape of the character, and the several characters are separated by continuous valleys V. The segments of the peaks P forming the characters have a predetermined, longitudinal alignment or orientation, and that longitudinal alignment is aligned with a longitudinal alignment or orientation of a strip 19 of the containment material 30. The longitudinal alignment of the peaks P and valleys V is in the depicted embodiment parallel to the opposed longitudinal edges of the strip 19, and such longitudinal alignment must be established and reliably maintained during joining of the structured felt geotextile 33 with the geomembrane 32.

Figure 6:
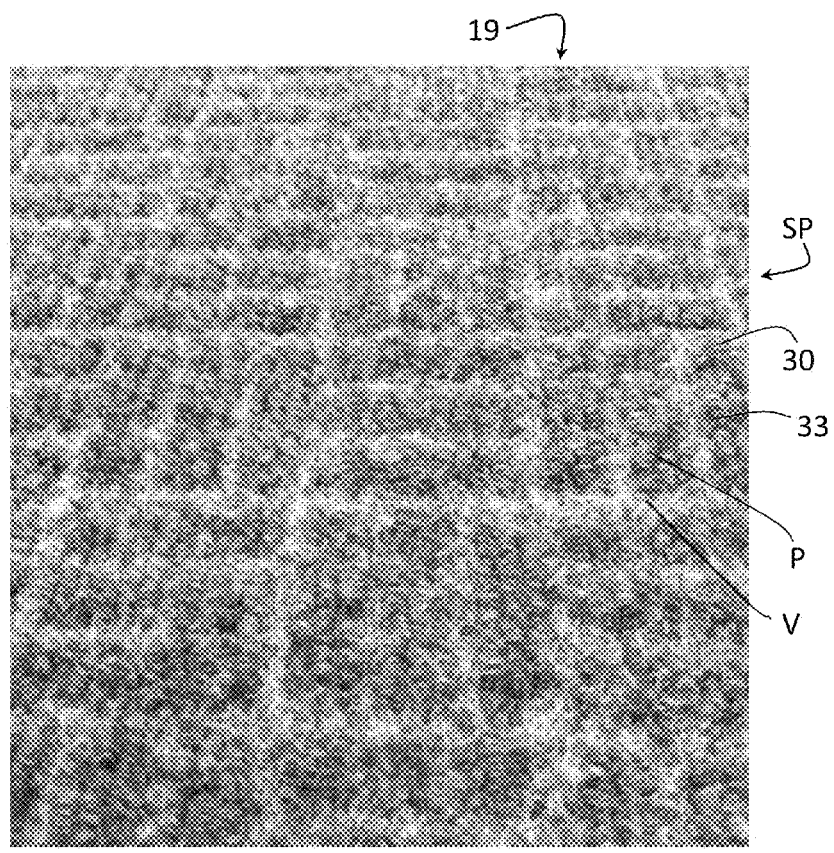
FIG. 6 is a perspective view of a portion of a strip of containment material with an alternative surface pattern formed in the geotextile surface layer.

Constructions of the containment material 30 can additionally or alternatively have a structured felt geotextile layer 33 with a structured surface pattern SP of peaks P and valleys V that is in a geometric pattern as in FIG. 6. This non-limiting structured surface pattern SP has orthogonally disposed, alternating groups of bars, each formed by plural closely spaced segments of raised peaks P with interposed valleys V configured to provide the shape of the bar, and the several bars are separated by valleys V. The segments of the peaks P forming the bars of the geometric surface pattern SP have a predetermined, longitudinal alignment or orientation, and that longitudinal alignment is aligned with a longitudinal alignment or orientation of a strip 19 of the containment material 30.

Figure 7:
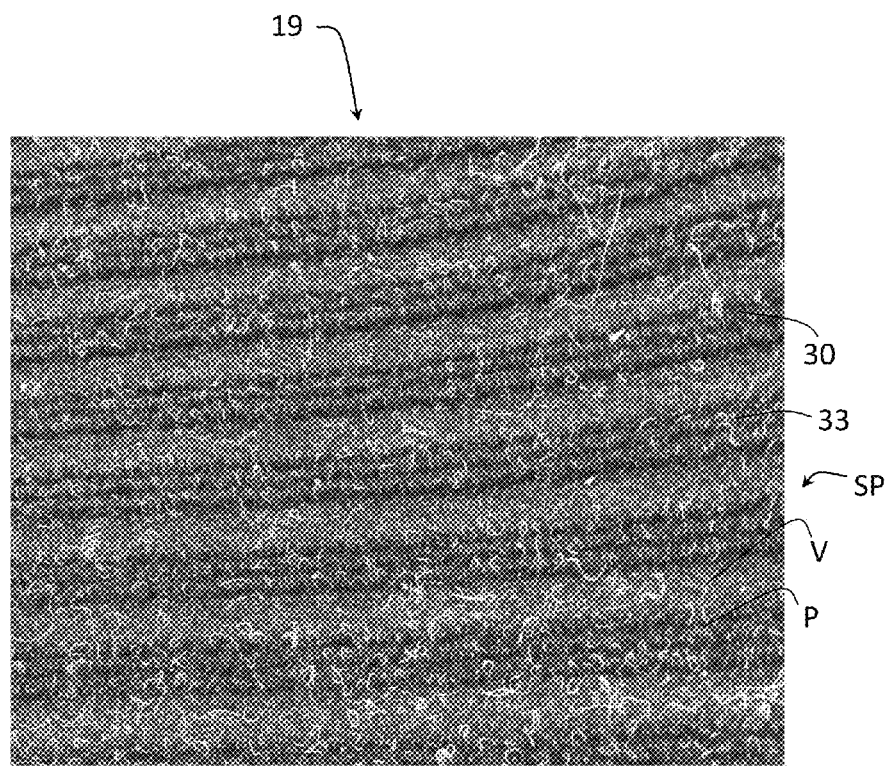
FIG. 7 is a perspective view of a portion of a strip of containment material with another surface pattern formed in the geotextile surface layer.
Figure 8:
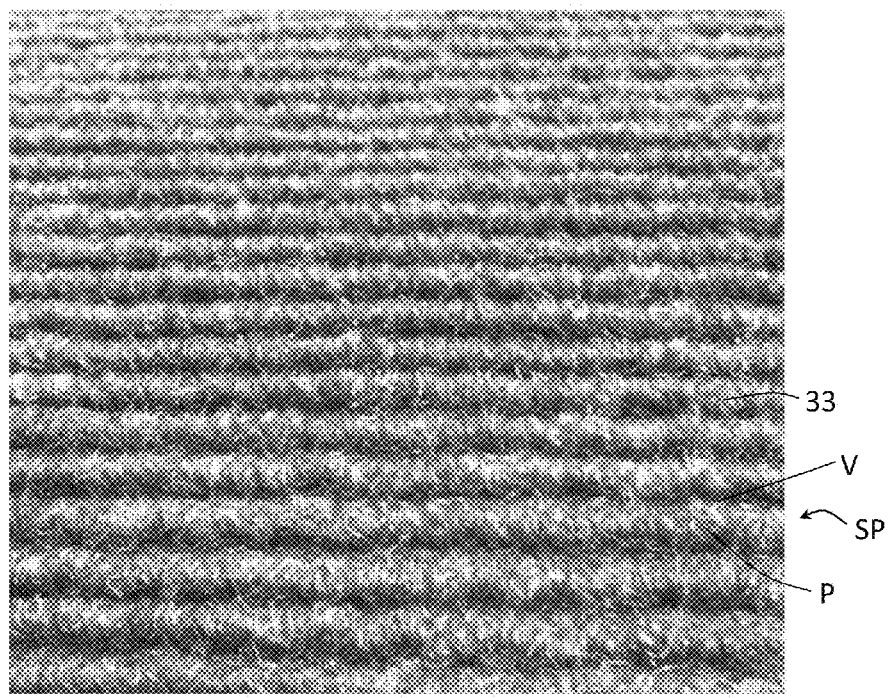
FIG. 8 is an amplified plan view of a surface pattern formed in the geotextile surface layer.

Another surface pattern SP of the infinitely possible surface patterns SP is shown in FIG. 7.

There, the containment material 30 has a structured felt geotextile layer 33 with a structured surface pattern SP of peaks P and valleys V with groups of plural closely spaced longitudinal peaks P with interposed valleys V configured to provide a group of peaks P, and the groups of peaks P are separated by wider valleys V. The peaks P of the surface pattern SP have a predetermined, longitudinal alignment or orientation, and that longitudinal alignment is aligned with a longitudinal alignment or orientation of a strip 19 of the containment material 30.

Still another surface pattern SP is shown in FIG. 9. There, the containment material 30 has a structured surface pattern SP of peaks P and valleys V with groups of plural closely spaced segments of longitudinal peaks P with interposed valleys V configured to provide a peaks P in a chevron surface pattern SP separated by wider valleys V. The chevron surface pattern SP and the segments of peaks P within the surface pattern SP have a predetermined, longitudinal alignment or orientation, and that longitudinal alignment is aligned with a longitudinal alignment or orientation of a strip 19 of the containment material 30.

In a still further embodiment as in FIG. 10, the containment material 30 has a structured surface pattern SP of peaks P and valleys V with longitudinal peaks P with interposed valleys V configured in what may be referred to as a corduroy pattern. The corduroy surface pattern SP and the peaks P within the surface pattern SP have a predetermined, longitudinal alignment or orientation, and that longitudinal alignment is aligned with a longitudinal alignment or orientation of a strip 19 of the containment material 30.

These and other patterns can provide for channeling and drainage of fluids during operations, for load distribution, and for enhanced traction. In particular, the pattern of the valleys V as bounded by the peaks P forms capillaries, longitudinal capillaries in the case of the corduroy pattern and V-shaped capillaries in the case of the chevron pattern.

In the chevron pattern of FIG. 9, the peaks P and the valleys V alternate in an organized pattern of what is effectively sequences of oppositely faced V-shapes that are in the depicted embodiment aligned and oriented longitudinally in relation to the geomembrane barrier layer 32 and longitudinally along the strip 19 of containment material 30. In the corduroy pattern of FIG. 10, the peaks P and the valleys V are disposed in an organized pattern longitudinally aligned and oriented along the strip 19 of containment material 30 and longitudinally aligned and oriented in relation to the geomembrane barrier layer 32.

As discussed further herein, characters, symbols, geometric and other surface patterns SP within the structured felt geotextile layer 33 that have a desired longitudinal alignment and orientation in relation to the geomembrane barrier layer 32 and the strip 19 of containment material 30 increase the criticality of mutual alignment between the layers 32 and 33. Stated alternatively, by virtue of the patterning of the structured felt geotextile layer 33, it is critically necessary that the geotextile layer 33 and the geomembrane barrier layer 32 be joined with a precise alignment between them during assembly and production to avoid waste. Concomitantly, as is also further described herein, the introduction of the peaks P and the valleys V within a felt geotextile layer 33 as been found by the present inventors further to introduce a tendency of the structured geotextile layer 33 to misalign or "walk" in relation to the geomembrane layer 32 during production, making the required joining or marrying of the geomembrane layer 32 and the geotextile layer 33 exceptionally challenging.

The containment material 30 can have the structured geotextile layer 33, the geomembrane barrier layer 32, and, where included, the sub-layer 31 laminated together, in any effective method, such as adhesion, extrusion, heat welding, or another effective method or combination thereof. In any method for joining, alternatively referred to as laminating or marrying, the structured geotextile layer 33 to the geomembrane barrier layer 32, it will be noted that the patterning of the geotextile layer 33 increases the criticality of laminating the layers 32 and 33 together in alignment. Any surface pattern SP, such as the longitudinal corduroy or chevron surface patterns SP or any characters or symbols formed by peaks P and valleys V as in FIGS. 5 through 10 must be retained in longitudinal alignment and orientation in relation to the geomembrane barrier layer 32 during and after lamination.

Concomitantly, the use of nonwoven felt for the geotextile layer 33, as compared to a solid polymeric material for instance, has been found to render consistent and accurate alignment highly problematic. The challenges of producing consistent and accurate alignment are understood to be further complicated by the introduction of the valleys V into the nonwoven geotextile layer 33 by the additional structuring process. The relatively shallow valleys V present thinner cross sections, as is shown in FIGS. 3 and 4, and have been found to further destabilize the nonwoven geotextile layer 33 creating an inherent difficulty in producing consistent and accurate alignment of the fibrous nonwoven, structured geotextile layer 33 with the geomembrane barrier layer 32 during the joining of the layers 32 and 33. With inherently thinner cross sections, the valleys V present different resistances to torsional and other sources of deformation. In particular, patterned nonwoven fabric geotextile material with peaks P and valleys V has been found to tend to "walk" or shift laterally during lamination if not perfectly aligned and maintained in alignment since it exhibits different resistance to lateral displacement than non-structured material. Only by initial and maintained accurate alignment during lamination can a properly aligned resulting containment material 30 be produced and expensive waste minimized.

In each embodiment, the structured surface pattern SP of the geotextile layer 33 provides not only important improvements in traction atop the containment material 30 but also improved fluid control. The surface pattern SP further enables the ability to provide structured advertising, aesthetic designs, location indications, and other advantageous characteristics not possible with non-structured felts and other materials.

The structured felt geotextile surface layer 33 can be fabricated with or from a variety of materials according to the invention. For example, the geotextile surface layer 33 may include post-consumer polyester, polypropylene, para-aramid synthetic fiber, nylon synthetic polymer, blended materials, and, additionally or alternatively, any other suitable material as may be described herein or that would occur to one skilled in the art after reading the present disclosure. The material or materials forming the structured felt geotextile surface layer 33 can be selected to provide desired properties. For instance, in certain practices of the invention, the geotextile surface layer 33 is formed from a material or treated to have hydrophobic characteristics. The geotextile layer 33 could include mixtures of materials, including blended materials, and combinations of materials, including coated materials. The geotextile surface layer 33 could itself incorporate sub-layers. The structured felt geotextile surface layer 33 is designed to be physically robust and to resist physical and chemical damage, such as from production and other activities involving potentially hazardous materials.

The geomembrane barrier layer 32, married to the lower surface of the structured felt geotextile surface layer 33, provides a barrier that is substantially impervious to the diffusion of liquids thereacross. The geomembrane barrier layer 32 is constructed to provide substantial resistance to punctures, tears, and other physical hazards. The integrity of the geomembrane barrier layer 32 is aided by the presence of the geotextile surface layer 33 and, where present, the sub-layer 31.

The geomembrane barrier layer 32 may comprise a nonwoven material or a woven material. The material in the geomembrane barrier layer 32 may include mixtures of materials, including blended materials, and combinations of materials, including coated materials. The geomembrane barrier layer 32 could be formed as one layer or with a plurality of layers. In one embodiment, the geomembrane barrier layer 32 includes woven para-aramid synthetic fibers that are then coated with another material to render the barrier layer 32 impervious to the diffusion of liquids. The geomembrane barrier layer 32 may include thermoplastic polyolefin (TPO) and/or thermoplastic polyurethane (TPU), polypropylene, nylon synthetic polymer, blended materials and, additionally or alternatively, any other suitable material as may be described herein or that would occur to one skilled in the art after reading the present disclosure. By way of example and not limitation, other materials suited for use in the barrier layer 32 may include rubber and materials commonly used in place of rubber. In each embodiment, the geomembrane barrier layer 32 provides a layer that is substantially impervious to migration of spillage 17 into the Earth 2.

A variety of embodiments of materials may be used to provide the barrier function in the barrier layer 32. In some embodiments, thermoplastic materials for the barrier layer 32 may be provided in an amorphous state. In some other embodiments, the thermoplastic materials may be augmented with other materials. For example, woven fiberglass may be included in the geomembrane barrier layer 32 thus to provide increased tensile strength.

As FIGS. 3 and 4 show, the lower surface of the structured felt geotextile surface layer 33 is married, or closely joined in lamination, to the upper surface of the geomembrane barrier layer 32 continuously over the facing surfaces thereof With that, the geomembrane barrier layer 32 and the geotextile surface layer 33 form a unified containment material 30 for the containment system 22. As used herein, laminate, laminated, laminating, lamination, or other derivations of the term laminate shall refer to having layers of material firmly united. In some embodiments, the geomembrane barrier layer 32 is extruded onto the geotextile surface layer 33 during production.

Where a sub-layer 31 is included, the geomembrane barrier layer 32 can be extruded onto the sub-layer 31 during production.

Where included, the sub-layer 31 can comprise a thickness of material that provides for robust physical protection of the geomembrane barrier layer 32 and the structured felt geotextile top layer 33. The sub-layer 31 can provide strength and toughness to prevent hazards, such as loose gravel, from penetrating the containment material 30. In one embodiment, for example, the sub-layer 31 can be formed from a nonwoven geotextile. For example, the sub-layer 31 can be formed by substantially continuous needle-punched polyester or polypropylene nonwoven textile with flat upper and lower surfaces. The upper surface of the sub-layer 31 may be laminated, bonded, or otherwise attached to the lower surface of the geomembrane barrier layer 32.

In other embodiments, if included, the sub-layer 31 can be structured with a pattern of protuberating portions spaced over the lower surface thereof For example, the sub-layer 31 could be formed from needle-punched polyester or polypropylene nonwoven textile configured with a flat upper surface married to the lower surface of the barrier layer 32, and the sub-layer 31 can have a lower surface with a non-parallel or a regular pattern of structured protuberating portions spaced thereover. In such embodiments, the structured protuberating portions spaced over the lower surface of the sub-layer 31 can operate to provide enhanced gripping of the containment material 30 when disposed to cover a ground surface. Such a bottom layer 31 with a structured lower surface may be provided to reduce or eliminate sliding, punching, and ring claim of the containment material 30. Such phenomena may be exhibited or caused by, for example, heavy vehicle traffic over the containment system 22 as well as day-to-day foot travel and other operations. Top pressure from such activities will tend to force the structured sub-layer 31 into the ground surface thus locking the containment system 22 into the ground. The effect of ground surface irregularities will also be reduced by virtue of the gripping force provided by the structured sub-layer 31.

The sub-layer 31 could be a non-woven material or a woven material. The sub-layer 31 may include mixtures of materials, including blended materials, combinations of materials, including coated materials, and may itself include sub-layers. In one embodiment, the sub-layer 31 includes a non-woven, flat-needled fabric. The sub-layer 31 can include a wide wale, looped material.

The sub-layer 31 could be fabricated from a variety of materials capable of providing the intended functions. For example, the sub-layer 31 could include post-consumer polyester, polypropylene, para-aramid synthetic fiber, nylon synthetic polymer, blended materials, and, additionally or alternatively, any other suitable material as may be described herein or that would occur to one skilled in the art after reading the present disclosure.

The containment material 30 can be fire resistant. For instance, the materials of one or more of the geomembrane barrier layer 32, the structured geotextile surface layer 33, and, where included, the sub-layer 31 can be selected, treated, or coated to establish fire resistance, which can be particularly advantageous in the hostile environments of oil and gas production.

The structuring of the upper surface of the geotextile surface layer 33 married to the geomembrane barrier layer 32 provides increased traction to persons and traversing the upper surface of the containment system 22. The patterning of plural peaks P and plural valleys V and the resultant safety improvements deriving from the improved traction provided by them differentiate the containment material 30 from flat-surfaced materials. Such flat-surfaced materials, even flat non-woven materials, do not provide corresponding traction benefits and do not undergo the processing steps required to produce the structured non-woven fabric of the geotextile surface layer 33 of the present invention. For instance, with the plural peaks P and plural valleys V provided by the geotextile surface layer 33, incident spillage can be channeled and otherwise managed by the valleys V while the peaks P tend to remain fully available and effective for traction in a manner not possible with flat-surfaced non-woven materials.

Concomitantly, the plurality of peaks P and valleys V provide for enhanced handling and control of the drilling fluid 16. In some embodiments, material in the containment material 30 includes features or patterns intended to provide a particular design in the containment system 22 once assembled. For example, the containment material 30 used in the containment system 22 may include a plurality of capillaries formed by the patterning of the peaks P and valleys V, the capillaries connecting to a larger channel that leads to a location for installation of a sump pump or other type of control device.

In one embodiment where the structured felt geotextile layer 33, the geomembrane barrier layer 32, and the sub-layer 31 are included, the overall thickness T of the containment material 30 can be approximately 211 mils. The thickness $T_{31}$ of the sub-layer 31 in such a construction could be about 20 mils. The thickness $T_{32}$ of the geomembrane barrier layer 32 in this exemplary embodiment is between about 25 to 30 mils, and the geomembrane barrier layer 32 can comprise or include thermoplastic olefin (TPO). The thickness $T_{33}$ of the structured felt geotextile layer 33 in the locations of the peaks P and measured from the lower surface of the geotextile layer 33 to the maximum height of the peaks P is about 169 mils. In the exemplary embodiment, a width of the peak, P, is about 223 mils, while a width of the valley, V, is about 125 mils. In the exemplary embodiment, the valley, V, is about 111 mils deep so that the thickness of the structured felt geotextile layer 33 in the locations of the valleys Vis approximately 58 mils or approximately 34 percent of the maximum thickness of the structured felt geotextile layer 33 at the height of the peaks P.

Of course, actual and relative dimensions and thicknesses may be varied except as may be expressly set forth in the claims. Furthermore, with respect to the drawings, particularly the cross-sectional views, it is to be noted that the size and distribution of the fibers and other components are not intended to be to scale. Any material type suggested, such as by cross-sectioning, is merely representative of the material type in certain embodiments and is not intended as limiting. It will be understood that particular dimensions and thicknesses of the materials and layers forming the containment material 30 can be selected based on, by way of example and not limitation, the nature of the production activities. Considerations for production activities may include ease of installation and removal, duration of use, nature of use, including the weight of equipment, chemical interaction with drilling fluid 16 and other materials, cost, and other considerations. Materials used in the containment material 30 may be selected to withstand production demands over a variety of operational conditions. By way of non-limiting example, material used in the containment material 30 may be configured to withstand production demands between temperatures of about minus 20° F. to about 140° F.

In one non-limiting example, the structured felt geotextile layer 33 comprises a 15 oz. material, the geomembrane barrier layer 32 comprises a 25 mil TPO (thermoplastic polyolefin) core, and the sub-layer 31 comprises an 8 oz. backing. In another embodiment, the laminated material 30 for the containment system 22 includes a 15 oz. structured felt geotextile layer 33, a 30 mil TPO (thermoplastic polyolefin) geomembrane layer 32, and a 15 oz. chevron-patterned sub-layer 31. In yet another embodiment, the laminated material 30 includes a 15 oz. structured geotextile layer 33, a 35 mil TPU (polyurethane) geomembrane layer 32, and a 15 oz. chevron-patterned sub-layer 31.

Additional exemplary thermoplastics suited for use to form the geomembrane barrier layer 32 include, without limitation: poly (methyl methacrylate) (PMMA); polyamides, such as nylon elastic synthetic polymer; polybenzimidazole; polyethylene; polypropylene; polystyrene; polyvinyl chloride (PVC); polytetrafluoroethylene (PTFE); and other materials or compounds exhibiting fluid impervious properties.

In other embodiments, the laminated material 30 for the containment system 22 includes a 16 oz. wide-wale, needled and patterned structured material, such as polyester, forming the structured geotextile layer 33, a 35 mil to 45 mil thickness of woven para-aramid synthetic fiber coated with TPU (thermoplastic polyurethane) or a similar material to form the geomembrane layer 32, and a 16 oz. sub-layer 31 made of polyester and/or nylon, potentially including para-aramid synthetic fiber. When such para-aramid synthetic fiber is spun, the resulting fibrous product can have a tensile strength of about 3,620 MPa, and a relative density of 1.44. Para-aramid synthetic fiber maintains its strength and resilience down to cryogenic temperatures, approximately minus 196 degrees Celsius.

Para-aramid synthetic fiber, such as that sold under the registered trademark KEVLAR by the DuPont Chemical Corp. of Wilmington, Del., is one example of a high-strength material that can advantageously be used in the containment material 30. Para-aramid synthetic fiber may be used in the containment material 30 as described herein. Other high-strength materials may include other aramid, meta aramid, and/or poly-aramid fibers. Various forms of carbon, such as carbon nanotubes, may be used. Such materials may be used in addition to or as an alternative to the para-aramid synthetic component. Accordingly, the containment system 22 may be used over unstable ground conditions and in extreme weather conditions while minimizing the environmental impact.

One or more of the layers 31, 32, or 33 could use another para-aramid high-strength material as sold under the registered trademark TWARON by Teijin Aramid. That material advantageously demonstrates heat-resistance and strong synthetic fiber characteristics. The material was developed by the Dutch company Akzo, Enka division, later Akzo Industrial Fibers. The material is lightweight and has remarkable puncture strength qualities. Fibers of the material may be woven to make a fabric. The fabric can be coated with urethane to make the fabric impermeable to liquids and, therefore, one possible material for the geomembrane layer 32 according to the invention.

In some embodiments, it could be possible for only a selected portion of the containment system 22 to include such high-strength materials. For example, in some embodiments, a high-traffic area or heavy equipment area may include material 30 incorporating high-strength materials while other areas may rely on lower-cost materials.

In another embodiment, a quatro-laminate, four-layer material, can be used in the containment material 30. As one example, a quatro-laminate may include a 16 ounce wide-wale polyester layer as the structured geotextile layer 31, a 45 mil TPU layer that may include a high-strength material forming the geomembrane layer 32, a 10 ounce polyester needled fabric forming the sub-layer 31, and a 10 ounce base material (not shown) that incorporates a blend of nylon elastic synthetic polymer and para-aramid synthetic fiber. Of course, the thickness of each layer 31, 32, 33, n may be varied as deemed appropriate. In that regard, it should be understood that any layer 31, 32, 33, n disclosed herein, in at least some embodiments, may include a combination of sub-layers.

In embodiments of the containment material 30, it is further contemplated that the upper surface of the structured felt geotextile layer 33 could be treated to increase traction characteristics. In one such practice of the invention, the distal tips of the peaks P can comprise or incorporate a low melt polypropylene fiber to create nubs thereon. The nubs could, in certain embodiments, be differently and/or brightly colored, such as by have an orange color. Such nubs roughen the surface, increase anti-slip, trip, and fall characteristics, and increase visibility.

As shown in FIGS. 9 and 10, each strip 19 of the containment material 30 may include at least a portion configured for joining with another strip 19 of containment material 30. A portion of each strip 19 is shown in each of FIGS. 9 and 10 with the understanding that the strips 19 of containment material 30 in practice are initially disposed in roll form. In certain practices, strips 19 of containment material 30 can be from approximately 6 feet to 18 feet wide and in desired lengths with the strips 19 rolled for storage and transport. In one particular practice of the invention, the strips 19 are manufactured and distributed in rolls of approximately 6.5 feet in width and 300 feet in length to be cut to length and laterally joined to form the containment system 22 as disclosed herein.

As shown in FIGS. 9, 10, 13, and 14, each strip 19 has a patterned portion 41 that communicates longitudinally along the strip 19 with a surface pattern SP disposed thereon and a joint portion 42 that communicates longitudinally along an edge of the strip 19 beside the patterned portion 41. The patterned portion 41 comprises a substantial portion of the overall width of the strip 19, and the joint portion 42 communicates longitudinally along an edge of the strip 19 to present an elongate joint surface for facilitating an impervious joining with an adjacent, similarly constructed strip 19. Where the strip 19 has an overall width of approximately six feet, the joint portion 42 may, only as an illustrative but not limiting example, be several inches, such as three to six inches, wide. However, strips 19, which could alternatively be referred to as panels 19, can be of any width depending on the circumstances. Indeed, panels 19 pursuant to the invention can, by way of further examples, be ten or twelve feet wide or narrower or wider.

In practice, preparation of the production area 21 for installation of the containment system 22 may be accomplished by removing large obstacles, such as rocks, trees and other obstacles. The degree of preparation undertaken may be at the discretion of the user, manufacturer, operator, or other similarly interested party. Preparation of the production area 21 may involve grading of the ground surface with grading equipment, such as a bulldozer and any other necessary equipment.

Once the production area 21 has been prepared for installation of the containment system 22, a first strip 19 of containment material 30 is unfurled from a roll. A second strip 19 of containment material 30, which may similarly be unfurled from a roll, is disposed in parallel to the first strip 19 of containment material 30. The first and second strips 19 of containment material 30 can then be fastened together, preferably in a fluid-impervious bonding of the strips 19. Additional strips 19 can be laterally or otherwise joined in sufficient number and dimension to provide coverage to the entire production area 21.

Figure 11:
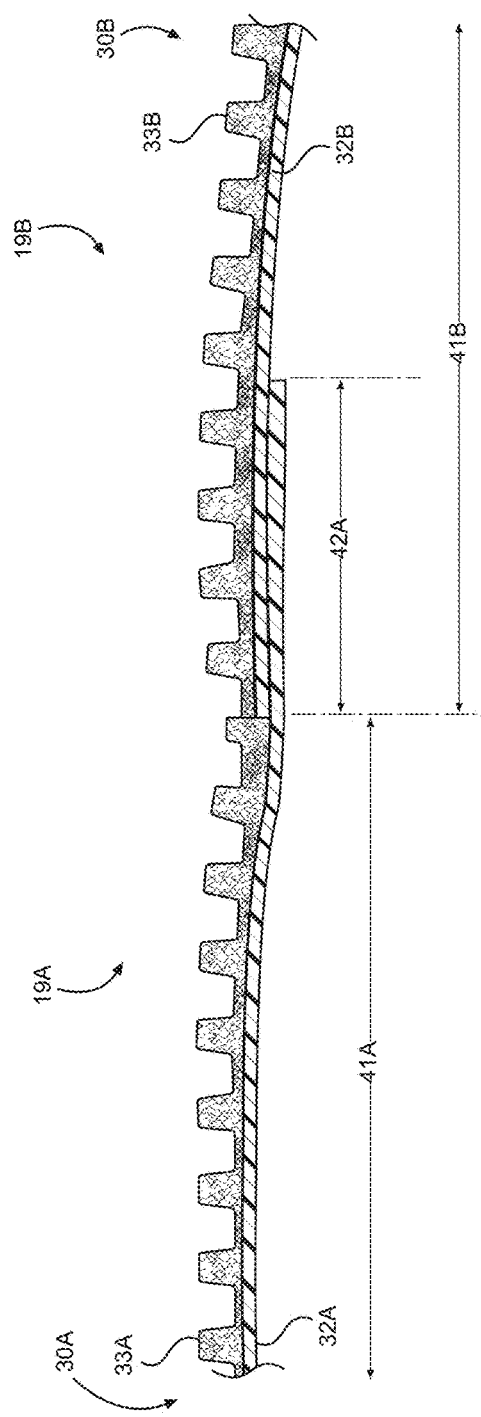
FIG. 11 is a cross-sectional view of first and second strips of containment material joined according to the invention.
Figure 12:
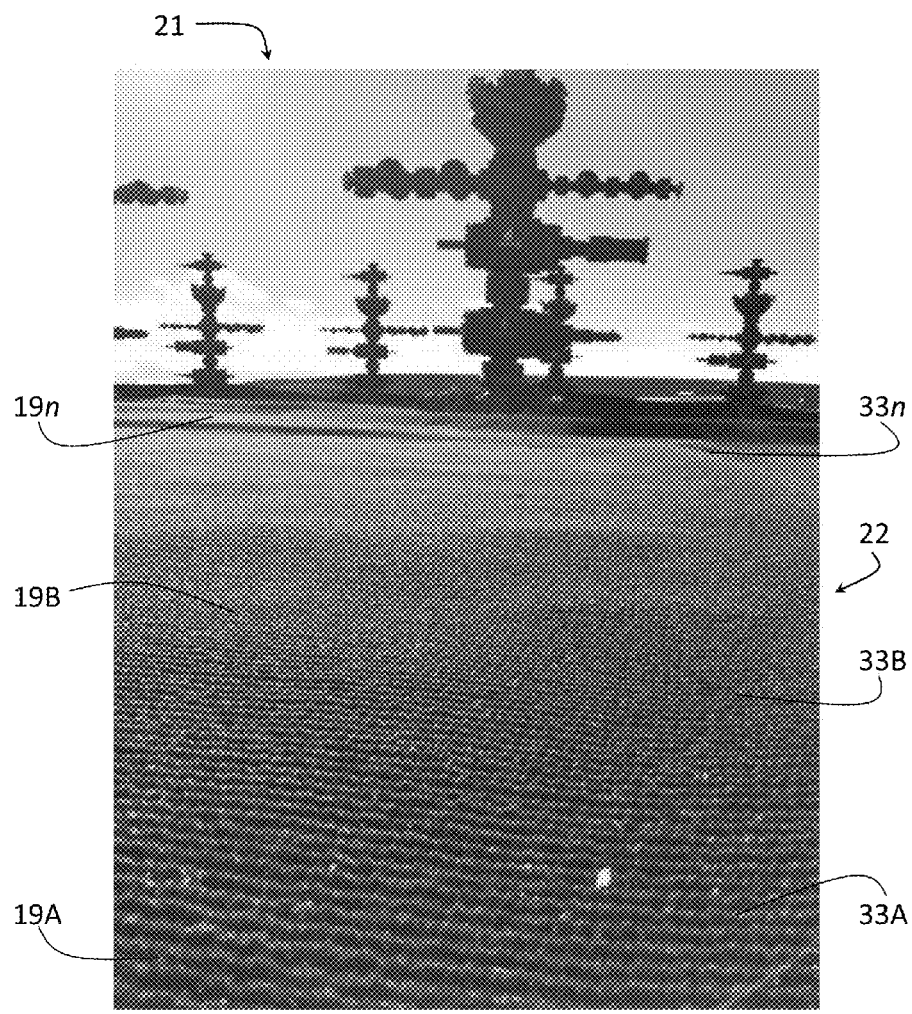
FIG. 12 is a perspective view of plural strips of containment material joined according to the invention to form a containment system with a continuous, structured surface.

The joining of adjacent strips as disclosed herein can be further understood with reference to FIGS. 11 and 12. In FIG. 11, a first strip 19A of the containment material 30 of FIG. 3 is laterally joined with a second strip 19B of the containment material 30 of FIG. 3. As FIG. 11 illustrates in relation to the first strip 19A, the patterned portion 41A comprises a width of containment material 30A including the structured geotextile surface layer 33A and the geomembrane barrier layer 32A. In certain embodiments but not the one illustrated, the containment material 30A can include the sub-layer 31. The joint portion 42A, which may alternatively be referred to as a weld lip, travelling longitudinally along a first longitudinal edge of the elongate strip 19A is devoid of the structured geotextile surface layer 33A. The upper surface of the geomembrane barrier layer 32A is thus exposed as a longitudinal joining strip along the joint portion 42A. Over the patterned portion 41A, which spans from the inner edge of the joint portion 42A entirely laterally across to the second longitudinal edge of the elongate strip 19A, the containment material 30A includes the structured felt geotextile surface layer 33A and the geomembrane barrier layer 32A.

Under this construction, as FIG. 11 illustrates, plural elongate strips 19A and 19B similarly disposed can be laterally joined, such as by joining an upper surface of the geomembrane barrier layer 32A of the joint portion 42A of the first strip 19A to an overlapping lower surface of a geomembrane barrier layer 32B of a patterned portion 41B of an adjacent strip 19B. With that, a substantially continuous, patterned surface of structured geotextile surface layer 33A, 33B, 33n is provided.

As disclosed herein, strips 19 can be configured and joined to cover a containment area 21 with a containment system 22 of any size. Depending on the length and width of the containment area 21, strips 19A, 19B, 19n can be joined, such as by plastic welding, in substantially any length, width, and number to cover the entire containment area 21 with a containment system 22 that is substantially impervious to the passage of contaminants while providing a continuous, high-traction structured surface. One such containment system 22 is depicted in FIG. 12. There, plural strips 19A, 19B, 19n are joined by a bonding of their respective joint portions and geomembrane barrier layers (both unseen in FIG. 12). When the strips 19A, 19B, 19n are assembled and joined in alignment, the joints between the joined strips 19A, 19B, 19n become imperceptible, the surface patterns are aligned longitudinally within the strips 19A, 19B, 19n and in parallel between adjacent strips 19A, 19B, 19n, and a continuous, high-traction surface pattern of peaks and valleys is presented by the structured felt geotextile surface layers 33A, 33B, 33n of the several strips 19A, 19B, 19n. The liquid-impervious, high-traction surface so presented represents the cumulation of, among other things, the challenging mutual alignment of the geotextile surface layers 33A, 33B, 33n with their underlying geomembrane barrier layers (not shown in FIG. 12) during production, the advantageous characteristics of the structured surface patterns of the structured felt geotextile surface layer 33, the impervious nature of the geomembrane barrier layer, and the ability to join adjacent strips 19A, 19B, 19n to form a consistent, substantially continuous surface pattern over an entire containment system 22 of substantially any size.

The containment system 22, formed by plural strips 19A, 19B, 19n coupled in parallel, can thus be efficiently installed to provide a high-traction, fluid-impervious work surface over the production area 21. With the plural layers of the geotextile surface layer 33, the geomembrane barrier layer 32, and, where included, the sub-layer 31 formed as a unitary strip product ready for multi-strip joining, minimized time is required in the field in the assembly process.

Adjacent strips 19A, 19B, 19n can be fastened in a manner substantially impervious to fluid penetration. By way of example and not limitation, the fastening of adjacent strips 19A, 19B, 19n can be achieved by mechanical bonding, chemical bonding, combinations thereof, and by any other technique or combination of techniques effective to produce the effective joining of the adjacent strips 19A, 19B, 19n.

In one example, bonding of adjacent strips 19A, 19B, 19n is provided by an ultrasonic bonding tool. Such an ultrasonic bonding tool receives each strip 19A, 19B, 19n, assists in aligning the strips 19A, 19B, 19n, and bonds the aligned strips 19A, 19B, 19n together. The ultrasonic bonding tool can then back away or otherwise be displaced from the bonded seam out to a peripheral edge of the containment system 22. Where bonding is performed, no glue or adhesive is used in or required for the assembly process.

Bonding can be carried out by inserting a plastic welding tool between the upper surface of the geomembrane barrier layer 32A of a first strip 19A of material 30A in the joint portion 42A and the lower surface of the geomembrane barrier layer 32B of a second strip 19B of material 30B along an edge thereof opposite its own joint portion 42. The plastic welding tool can then heat the joint portion 42A of the first strip 19A and, additionally or alternatively, the geomembrane barrier layer 32B of the second strip 19B. Pressure can be applied, such as by a roller. The joint portion 42A of the first strip 19A can then be bonded by plastic welding to the geomembrane barrier layer 32B of the second strip 19B to form a fluid-impervious bond therebetween.

As discussed herein, each strip 19 of containment material 30 represents a segment of material suited for use in the containment system 22. Strips 19 can, but need not necessarily, be dispensed from a roll. Each strip 19 of containment material 30 can be formed with any suitable shape and size except as the same may be expressly limited by the claims. In some embodiments, the containment material 30 can additionally be provided to be employed as a patch to a containment system 22 as disclosed herein.

The containment material 30 and strips 19 of the containment material 30 could, in certain practices, be fabricated using extrusion processes. Where a sub-layer 31 is included, the geomembrane barrier layer 32 could be extruded directly onto the sub-layer 31. The geomembrane barrier layer 32 could be extruded between the sub-layer 31 and the geotextile surface layer 33. In any case, the geotextile surface layer 33 and the geomembrane barrier layer 32 and, where included, the sub-layer 31 are married, closely joined, over substantially their entire facing surfaces to make for a solid, unitary, potentially unicaste, product. Where the geomembrane barrier layer 32 is extruded directly onto the geotextile surface layer 33 and, additionally or alternatively, the sub-layer 31, the material of the barrier layer 32 turns from a liquid to a solid as it cools. Bonding is achieved without a need for glue or adhesive products. This process ensures long lasting durability and performance.

The geotextile surface layer 33, the geomembrane barrier layer 32, and, where included, the sub-layer 31 can be married or joined by one or more lamination processes. The lamination processes may include hot fabrication and application of substantial pressure to ensure bonding of the geotextile surface layer 33, the geomembrane barrier layer 32, and, where included, the sub-layer 31. In some embodiments, the lamination process includes intermediate materials, such as glue and/or adhesive. Optional finishing materials may include protectant materials, such as UV absorbers. For example, UV absorbers may be incorporated directly into the geotextile surface layer 33 or applied thereto.

The basic steps for creating a containment material 30 according to the invention with a nonwoven, structured, needle-punched felt geotextile layer 33 laminated to a geomembrane barrier layer 32 would thus require first obtaining a nonwoven, structured felt geotextile material with a pattern of peaks P and valleys V therein and obtaining a liquid impervious geomembrane barrier material. The step of obtaining the nonwoven, structured, needle-punched felt geotextile material with a pattern of peaks P and valleys V therein would typically entail first needle-punching a carded web of fibers to mechanically orient and interlock the fibers of the carded web by operation of barbed felting needles repeatedly passing into and out of the web to provide a needled, nonwoven web. Then, the needled, nonwoven web must undergo a secondary, structuring process, such as a secondary needling process, to produce a structured nonwoven with plural peaks P and plural valleys V in a desired pattern on what will ultimately be the upper surface of the geotextile layer 33. Then, the nonwoven, structured, needlepunched felt geotextile layer 33 and the geomembrane layer 32 are laminated together, whether by adhesion, extrusion, or some other method or combination thereof The geotextile layer 33 is disposed in original and continuing precise longitudinal alignment with the geomembrane layer 32 so that the pattern of peaks P and valleys V have an accurate, predetermined alignment with a shared longitudinal orientation of the geotextile layer 33 and the geomembrane layer 32. In this regard, it will again be recognized that only by maintaining accurate alignment during lamination can a properly aligned resulting containment material 30 be produced and can expensive waste be minimized.

Where a joint portion 42 is to be provided communicating longitudinally along the resulting strip 19 of containment material, the joint portion 42 can be formed during or subsequent to joining of the structured felt geotextile layer 33 and the geomembrane layer 32. For instance, the structured felt geotextile layer 33 and the geomembrane layer 32 can be laminated with a joint portion 42 of the geomembrane layer 32 exposed, such as by the geomembrane layer 32 being wider than the geotextile layer 33 and by having one longitudinal edge of the geotextile layer 33 aligned with a longitudinal edge of the geomembrane layer 32 and the joint portion 42 of the geomembrane layer 32 exposed. In other practices, a longitudinal edge portion of geotextile layer 33 could be removed from overlying the geomembrane layer 32 to produce the longitudinal joint portion 42.

The resulting containment system 22 provides increased traction over the production area 21 for persons and vehicles traveling thereon while exhibiting environmental containment of hazardous spillage, durability, and efficient cleanup. As constructed hereunder, the containment material 30 can be pressure washed and otherwise cleaned and maintained. In certain practices, the containment material 30 can be fabricated from 100% post-consumer materials. In one example, material for one or more of the layers 31, 32, or 33 can be derived from recycled bottle flake, such as that provided by recycling of plastic drink containers.

The containment system 22 thus provides a safety barrier that can be installed quickly, reused, recycled, and easily repaired. The containment system 22 can be designed to last through the entire operational cycle of drilling, completions, fracking, and production. In some cases, some or all of the containment system 2 can be reused.

The containment material 30 can be readily and effectively repaired. In some embodiments, the containment material 30 can be repaired with traditional handheld, hot air welding tools. Where necessary, portions of the peaks V and valleys V forming the pattern on the geotextile surface layer 33 can be removed, such as with a hand-held grinder or other tool, to prepare the geotextile surface layer 33 for installation of a patch of material, which could be the disclosed containment material 30 or some other material. By way of example, the containment system 22 can be repaired with modest surface preparation and bonding or gluing of a layer of material over a repair area. The techniques used to join adjacent strips 19 of material 30 can be used to join the patch to the repair area.

According to the invention, containment material 30 can be provided in a variety of colors. In certain embodiments, the containment material 30 could be assembled to include graphics or other visual guidance. For instance, the containment material 30 can be constructed to provide colored patterns or surface patterns SP of the geotextile surface layer 33 providing location indications for laydown areas, production areas, locations of a wellbore, and other areas. As disclosed herein, unique physical patterning can also be included in the containment system 22. For example, portions of broader surface patterns, such as unique arrangements of peaks P and valleys V, can be included in respective strips 19 of containment material 30. Once the strips 19 of containment material 30 are sequentially placed and joined, combined surface patterns SP spanning a plurality of adjacent strips 19A, 19B, 19n of material 30 can be provided, such as to indicate laydown areas, production areas, locations of a wellbore, and other areas.

In embodiments of the containment system 22, as can be seen in FIG. 2 for instance, a raised edge or berm 18 can be constructed to form a physical lateral barrier against contaminant leakage through spillage 17. The berm 18 can, for example, be installed about a perimeter of the containment system 22 and along the periphery of the containment or production area 21. A segment of one embodiment of the berm 18 is shown in FIG. 2 with it being understood that a berm 18 may be formed to span some or all of the periphery of the containment system 22. In some embodiments, a berm 18 can additionally or alternatively be installed in proximity to and around the wellbore 1.

In any event, the berm 18 will normally surround, substantially surround, of otherwise be disposed to prevent fluid contamination from the wellbore 1 since the wellbore 1 acts as the point of origin for the emission of drilling fluid 16. It will be understood that the topography of a given production area 21 may warrant variations in the formation of the berm 18. As disclosed herein, a berm 18 may be formed by a portion of the containment material 30, such as the containment material 30 forming one or more strips 19, or a berm 18 may be formed as a separate construction and joined to the containment material of the containment system 22 in a manner such that the resulting joint provides a barrier that is substantially impervious to penetration by spillage 17.

The berm 18 may include high density foam rubber in various shapes and sizes. The material used in the berm 18 may be sealed to provide for chemical resistance. In some embodiments, the berm 18 is affixed to the strip of material 19 in a manner similar to how one strip of material 19 is affixed to another strip of material 19. In some embodiments, the berm 18 is formed by inserting one or more members, such as one or more members of resiliently compressible material, underneath a periphery of the containment system 22. For example, filling material, such as members of high density foam rubber, can be selectively inserted under one or more portions or the entire periphery of the containment system 22 thereby to produce a raised peripheral ridge.

As used here, the phrase substantially impervious refers to the capability of the containment material 30 of the containment system 22 to limit migration or loss of control of environmental contaminants when in non-perforated condition. It will nonetheless be recognized that leakage can occur even with proper installation and use. For instance, heavy equipment can perforate the containment system 22, and such instances may be rendered more likely by inadequate site preparation. Efficacy of the containment system 22 may be measured against suitable standards, such as, for example, regulatory requirements for limiting effluent from production areas 21. Further, the phrase high-strength shall refer to tensile strength and/or puncture resistance and shall be in comparison to other materials as may be used in the containment material 30 and/or in comparison to other flexible materials used in alternative containment technologies.

Terms of orientation provided herein are merely to provide a complete understanding of the disclosed containment system 22 and are not limiting of the invention. For example, a layer referred to as a top layer may alternatively be considered a first layer, and a layer referred to as a middle layer may alternatively be considered a second layer, or vice versa. Other nomenclature and conventions may be used without limitation of the teachings herein.

The various layers disclosed herein are merely illustrative and are not limiting of the invention. For example, except as limited by the claims, each of the layers discussed herein may include sub-layers that collectively provide for the function of the layer. Additional layers that provide additional functions, or enhancements to those introduced herein, may be included. Further, layers or sub-layers may be applied in a variety of ways. For example, material such as adhesives as may be desired between layers, surface protectants, such as UV absorbers, and other such materials may be sprayed on, rolled on or otherwise applied to a particular layer.

Various other components may be included and called upon for providing for aspects of the teachings herein. For example, additional materials, combinations of materials, and/or omission of materials may be used to provide for added embodiments that are within the scope of the teachings herein.

A variety of modifications of the teachings herein may be realized. Generally, modifications may be designed according to the needs of a user, designer, manufacturer, or other interested party. The modifications may be intended to meet a particular standard of performance considered important by that party.

When introducing elements of the present invention or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an embodiment that is one of many possible embodiments.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

With certain details and embodiments of the present invention for a structured containment material 30 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventors. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, any such claims shall be construed to cover not only the corresponding structure and material expressly described in this specification but also all equivalents thereof.

We claim as deserving the protection of Letters Patent:

1. A containment material for providing protection to a containment area against diffusion of contaminants, the containment material comprising:
a structured felt geotextile surface layer with an upper surface and a lower surface wherein the structured felt geotextile surface layer comprises a needle-punched, non-woven felt fabric structured to have a surface pattern in the upper surface of the structured felt geotextile surface layer comprising a pattern of peaks and valleys with plural peaks and plural valleys and wherein the structured felt geotextile surface layer is needle-punched in a first process to create a needled, non-woven web of fibers and then exposed to a secondary, structuring process to structure the geotextile felt surface layer to have the pattern of peaks and valleys;
a geomembrane barrier layer with an upper surface and a lower surface wherein the geomembrane barrier layer is substantially impervious to liquid diffusion;
wherein the structured felt geotextile surface layer is joined with the geomembrane barrier layer to form a lamination of the structured felt geotextile surface layer and the geomembrane barrier layer with the lower surface of the structured felt geotextile surface layer joined with the upper surface of the geomembrane barrier layer.

2. The containment material of claim 1, wherein the structured felt geotextile surface layer has a thickness in the plural valleys and a thickness of the structured felt geotextile surface layer in the plural peaks wherein the thickness in the plural valleys is less than the thickness in the plural peaks.

3. The containment material of claim 2, wherein the thickness in the plural valleys is between approximately one-quarter and one-half of the thickness in the plural peaks.

4. The containment material of claim 1, wherein the geomembrane barrier layer comprises woven para-aramid synthetic fibers coated with a secondary material to be impervious to liquid diffusion through the geomembrane barrier layer.

5. The containment material of claim 4, wherein the secondary material comprises a polymeric material.

6. The containment material of claim 1, wherein the geomembrane barrier layer is extruded onto the structured felt geotextile surface layer.

7. The containment material of claim 1, wherein at least one of the geomembrane barrier layer and the structured felt geotextile surface layer is fire resistant.

8. The containment material of claim 1, wherein the surface pattern in the upper surface of the structured felt geotextile surface layer comprises a pattern forming alphanumeric characters.

9. The containment material of claim 1, wherein the surface pattern in the upper surface of the structured felt geotextile surface layer comprises a chevron pattern or a corduroy pattern.

10. The containment material of claim 1, wherein the geomembrane barrier layer and the structured felt geotextile surface layer are joined to form a strip of containment material with a longitudinal orientation.

11. The containment material of claim 10, wherein the pattern of peaks and valleys has a predetermined longitudinal orientation aligned with the longitudinal orientation of the strip of containment material.

12. The containment material of claim 10, wherein the strip of containment material has a patterned portion comprising the structured felt geotextile surface layer laminated to geomembrane barrier layer and a joint portion that communicates longitudinally along a first longitudinal edge of the strip beside the patterned portion wherein the joint portion is devoid of the structured felt geotextile surface layer to form an elongate joint surface that communicates longitudinally along the first longitudinal edge of the strip.

13. The containment material of claim 12, wherein the structured felt geotextile layer communicates from the joint portion to a second longitudinal edge of the strip to form a substantially continuous, patterned surface of structured geotextile surface layer from the joint portion to the second longitudinal edge of the strip.

14. The process of claim 1, wherein the secondary, structuring process comprises a secondary needling process to reorient the fibers of the carded web mechanically.

15. A containment system for providing protection to a containment area against diffusion of contaminants, the containment system comprising:
a plurality of strips of containment material, each strip with a first longitudinal edge, a second longitudinal edge, and a longitudinal orientation;
wherein each strip of containment material comprises a structured felt geotextile surface layer joined with a geomembrane barrier layer to form a lamination of the structured felt geotextile surface layer and the geomembrane barrier layer with a lower surface of the structured felt geotextile surface layer joined with an upper surface of the geomembrane barrier layer, wherein the structured felt geotextile surface layer comprises a needle-punched, non-woven felt fabric structured to have a surface pattern in the upper surface of the structured felt geotextile surface layer comprising a pattern of peaks and valleys with plural peaks and plural valleys, wherein the structured felt geotextile surface layer is needle-punched in a first process to create a needled, non-woven web of fibers and then exposed to a secondary, structuring process to structure the geotextile felt surface layer to have the pattern of peaks and valleys, and wherein the geomembrane barrier layer is substantially impervious to liquid diffusion; and
wherein the plurality of strips are joined by a liquid-impervious bond to provide protection to the containment area against the diffusion of contaminants.

16. The containment system of claim 15, wherein the structured felt geotextile surface layer of each strip of containment material has a thickness of non-woven felt fabric in the plural valleys less than a thickness of non-woven felt fabric in the plural peaks.

17. The containment system of claim 15, wherein, in each of the plurality of strips of containment material, the geomembrane barrier layer is extruded onto the structured felt geotextile surface layer.

18. The containment system of claim 15, wherein, in at least one of the plurality of strips of containment material, the surface pattern in the upper surface of the structured felt geotextile surface layer comprises a pattern forming lettering.

19. The containment system of claim 15, wherein, in at least one of the plurality of strips of containment material, the surface pattern in the upper surface of the structured felt geotextile surface layer comprises a chevron pattern or a corduroy pattern.

20. The containment system of claim 15, wherein, in each of the plurality of strips of containment material, the geomembrane barrier layer and the structured felt geotextile surface layer are joined to form the strip of containment material with the longitudinal orientation.

21. The containment system of claim 20, wherein, in each of the plurality of strips of containment material, the pattern of peaks and valleys has a predetermined longitudinal orientation aligned with the longitudinal orientation of the strip of containment material.

22. The containment system of claim 20, wherein each of the plurality of strips of containment material has a patterned portion comprising the structured felt geotextile surface layer with the surface pattern laminated to geomembrane barrier layer and a joint portion that communicates longitudinally along a first longitudinal edge of the strip beside the patterned portion wherein the joint portion is devoid of the structured felt geotextile surface layer to form an elongate joint surface that communicates longitudinally along the first longitudinal edge of the strip and wherein first and second adjacent strips of the plurality of strips are joined by a liquid-impervious bond of the joint portion of the first strip with the geomembrane barrier layer of the second strip.

23. The containment system of claim 22, wherein, in each of the plurality of strips, the structured felt geotextile layer communicates from the joint portion to a second longitudinal edge of the strip to form a substantially continuous, patterned surface of structured geotextile surface layer from the joint portion to the second longitudinal edge of the strip.

24. The process of claim 15, wherein the secondary, structuring process comprises a secondary needling process to reorient the fibers of the carded web mechanically.

25. A method for providing protection to a containment area against diffusion of contaminants, the method comprising:
determining a containment area to be protected against the diffusion of contaminants;
providing a plurality of strips of containment material, each strip with a first longitudinal edge, a second longitudinal edge, and a longitudinal orientation;
wherein each strip of containment material comprises a structured felt geotextile surface layer joined with a geomembrane barrier layer to form a lamination of the structured felt geotextile surface layer and the geomembrane barrier layer with a lower surface of the structured felt geotextile surface layer joined with an upper surface of the geomembrane barrier layer, wherein the structured felt geotextile surface layer comprises a needle-punched, non-woven felt fabric structured to have a surface pattern in the upper surface of the structured felt geotextile surface layer comprising a pattern of peaks and valleys with plural peaks and plural valleys, wherein the structured felt geotextile surface layer is needle-punched in a first process to create a needled, non-woven web of fibers and then exposed to a secondary, structuring process to structure the geotextile felt surface layer to have the pattern of peaks and valleys, and wherein the geomembrane barrier layer is substantially impervious to liquid diffusion; and joining the plurality of strips by a liquid-impervious bond to provide protection to the containment area against the diffusion of contaminants.

26. The method of claim 25, wherein the containment area has a width and wherein the steps of providing the plurality of strips of containment material and joining the plurality of strips by a liquid-impervious bond comprises providing the plurality of strips sufficient to cover the width of the containment area.

27. The method of claim 26, wherein the containment area has a length and wherein the step of providing the plurality of strips comprises providing a plurality of strips sufficient to cover the length of the containment area.

28. The method of claim 25, wherein, in each of the plurality of strips of containment material, the geomembrane barrier layer and the structured felt geotextile surface layer are joined to form the strip of containment material with the longitudinal orientation.

29. The method of claim 28, wherein, in each of the plurality of strips of containment material, the pattern of peaks and valleys has a predetermined longitudinal orientation aligned with the longitudinal orientation of the strip of containment material.

30. The method of claim 25, wherein each of the plurality of strips of containment material has a patterned portion comprising the structured felt geotextile surface layer with the surface pattern laminated to geomembrane barrier layer and a joint portion that communicates longitudinally along the first longitudinal edge of the strip beside the patterned portion wherein the joint portion is devoid of the structured felt geotextile surface layer to form an elongate joint surface that communicates longitudinally along the first longitudinal edge of the strip and wherein adjacent strips of the plurality of strips are joined by a liquid-impervious bond of the joint portion of one adjacent strip with the geomembrane barrier layer of a second adjacent strip.

31. The method of claim 30, wherein, in each of the plurality of strips, the structured felt geotextile layer communicates from the joint portion to the second longitudinal edge of the strip to form a substantially continuous, patterned surface of structured geotextile surface layer from the joint portion to the second longitudinal edge of the strip.

32. The process of claim 25, wherein the secondary, structuring process comprises a secondary needling process to reorient the fibers of the carded web mechanically.

33. A process for forming a containment material for providing protection to a containment area against diffusion of contaminants, the process comprising:

providing a nonwoven, needle-punched, structured felt geotextile surface layer with an upper surface and a lower surface wherein the structured felt geotextile surface layer comprises a needle-punched, non-woven felt fabric structured to have a surface pattern in the upper surface of the structured felt geotextile surface layer comprising a pattern of peaks and valleys with plural peaks and plural valleys wherein the step of providing the nonwoven, needle-punched, structured felt geotextile material with a surface pattern in the upper surface of the structured felt geotextile layer with plural peaks and plural valleys comprises needle-punching a carded web of fibers to mechanically orient and interlock the fibers of the carded web in a first needle-punching process and then applying a secondary, structuring process to the fibers of the carded web to produce the plural peaks and the plural valleys;

providing a geomembrane barrier layer with an upper surface and a lower surface wherein the geomembrane barrier layer is substantially impervious to liquid diffusion; and joining the structured felt geotextile surface layer with the geomembrane barrier layer to form a lamination of the structured felt geotextile surface layer and the geomembrane barrier layer with the lower surface of the structured felt geotextile surface layer joined with the upper surface of the geomembrane barrier layer.

34. The process of claim 33, wherein the secondary, structuring process comprises a secondary needling process to reorient the fibers of the carded web mechanically.

35. The process of claim 33, wherein the geomembrane barrier layer and the structured felt geotextile surface layer are joined to form a strip of containment material with a longitudinal orientation.

36. The process of claim 35, wherein the pattern of peaks and valleys has a predetermined longitudinal orientation aligned with the longitudinal orientation of the strip of containment material.

37. The process of claim 35, wherein the strip of containment material has a patterned portion comprising the structured felt geotextile surface layer with the surface pattern laminated to geomembrane barrier layer and a joint portion that communicates longitudinally along a first longitudinal edge of the strip beside the patterned portion wherein the joint portion is devoid of the structured felt geotextile surface layer to form an elongate joint surface that communicates longitudinally along the first longitudinal edge of the strip.

38. The process of claim 37, wherein the structured felt geotextile layer communicates from the joint portion to a second longitudinal edge of the strip to form a substantially continuous, patterned surface of structured geotextile surface layer from the joint portion to the second longitudinal edge of the strip.

39. The process of claim 36, wherein the step of joining the structured felt geotextile surface layer with the geomembrane barrier layer to form a lamination of the structured felt geotextile surface layer and the geomembrane barrier layer comprises aligning the predetermined longitudinal orientation of the pattern of peaks and valleys of the structured felt geotextile surface layer with the longitudinal orientation of the strip of containment material and joining the structured felt geotextile surface layer with the geomembrane barrier layer.

40. The process of claim 37, comprising forming plural strips of containment material and joining the plural strips by liquid-impervious bonds.

* * * * *